United States Patent [19]

Zeinstra

[11] Patent Number: 4,827,520

[45] Date of Patent: May 2, 1989

[54] VOICE ACTUATED CONTROL SYSTEM FOR USE IN A VEHICLE

[75] Inventor: Mark L. Zeinstra, Grandville, Mich.

[73] Assignee: Prince Corporation, Holland, Mich.

[21] Appl. No.: 4,346

[22] Filed: Jan. 16, 1987

[51] Int. Cl.$^4$ .............................................. G10L 5/00
[52] U.S. Cl. .......................................... 381/43; 381/41; 381/42; 364/513.5
[58] Field of Search .................... 381/40–45; 364/513.5; 379/354

[56] References Cited

U.S. PATENT DOCUMENTS

| | | | |
|---|---|---|---|
| 4,297,528 | 10/1981 | Beno | 179/1 SB |
| 4,389,109 | 6/1983 | Taniguchi et al. | 354/60 L |
| 4,394,538 | 7/1983 | Warren et al. | 179/1 SD |
| 4,401,852 | 8/1983 | Noso et al. | 179/1 VC |
| 4,415,767 | 11/1983 | Gill et al. | 381/45 |
| 4,450,545 | 5/1984 | Kiski et al. | 367/198 |
| 4,462,080 | 7/1984 | Johnstone et al. | 364/513.5 |
| 4,493,100 | 1/1985 | Moriyama et al. | 381/43 |
| 4,501,012 | 2/1985 | Kiski et al. | 381/43 |
| 4,506,377 | 3/1985 | Kiski et al. | 381/41 |
| 4,506,378 | 3/1985 | Noso et al. | 381/43 |
| 4,509,133 | 4/1985 | Monobaron et al. | 364/513.5 |
| 4,516,207 | 5/1985 | Moriyama et al. | 364/424 |
| 4,528,687 | 7/1985 | Noso et al. | 381/43 |
| 4,532,648 | 7/1985 | Noso et al. | 381/41 |
| 4,538,295 | 8/1985 | Noso et al. | 381/43 |
| 4,558,459 | 12/1985 | Noso et al. | 381/43 |
| 4,637,045 | 1/1987 | Noso et al. | 381/43 |
| 4,644,107 | 2/1987 | Clowes et al. | 379/354 |

Primary Examiner—William M. Shoop, Jr.
Assistant Examiner—Brian Young
Attorney, Agent, or Firm—Price, Heneveld, Cooper, DeWitt & Litton

[57] ABSTRACT

A voice actuated control system for controlling vehicle accessories includes a voice processing circuit and memory for storing data representing command words employed to perform control functions for vehicle accessories and for detecting spoken command words and providing data corresponding thereto. A microprocessor compares the data to determine if a word match has occurred and provides a selected control output signal in such event. The microprocessor is coupled by an interface circuit to a plurality of devices to be controlled including for example, a cellular telephone, a radio receiver and the like. Also, in a preferred embodiment a display and control panel is provided to selectively provide visual prompts to the operator and a manual control. The microprocessor is programmed to provide a variety of tests on stored data and spoken word to improve the reliability of the system.

22 Claims, 19 Drawing Sheets

VOICE ACTUATED CONTROL SYSTEM FOR USE IN A VEHICLE

BACKGROUND OF THE INVENTION

The present invention pertains to a voice actuated control system in which voice commands are employed to provide controlling functions and particularly to a system for use in controlling vehicle accessories.

Existing voice actuated control system patents suggest systems for vehicular application ranging from controlling the radio volume to controlling windows and air conditioners. Some of the prior art patents disclose variable gain controls for speech amplifiers or filters to improve the reliability of voice control systems when used in a vehicle where ambient noise can vary and interfere with the systems recognition of a voice command. U.S. Pat. Nos. 4,401,852; 4,450,545; 4,493,100; 4,501,012; 4,506,377; 4,506,378; 4,516,207; 4,528,687; 4,532,648; 4,538,295; and 4,558,459 disclose variations of voice control systems for application to vehicles.

SUMMARY OF THE INVENTION

The system of the present invention represents an improvement over the prior art by providing a voice actuated control system which provides a higher degree of recognition of voice commands and the subsequent confirmation and carrying out of the commands in unique applications to the vehicle. One problem for example in voice recognition systems is that as the vocabulary increases, the recognition performance of the system tends to decrease. According to one aspect of the system of the present invention, vocabulary terms are grouped according to control functions and upon the recognition of a first command associated with a sequence of word commands, only those word commands which logically follow the first recognized word command will be recognized. Thus, for example, if the term "window" is employed in connection with opening or closing of windows 1, 2, 3 or 4 in a vehicle, only if the detected word "window" is followed by a detected spoken "1, 2, 3 or 4" and then "up" or "down" would the command be recognized as valid and be carried out. Thus, by comparing voice input commands with reference patterns for commands, improved recognition and control performance is provided.

According to other aspects of the present invention, relatively easy retraining can be effected if difficulty is experienced in recognizing a particular verbal command or series of commands without reprogramming the entire system. Also, according to one aspect of the present invention, if a voice command is not affirmatively recognized, the system provides an inquiry prompt to the operator until such time as confirmation of a valid command is received.

According to other aspects of the present invention, a display and control panel is provided which visually displays command words which can be used for selected control functions and also for providing a redundant manual control of selected functions. According to another aspect of the present invention, memory means are provided for storing a plurality of telephone numbers associated with names of persons or companies and upon recognition of a spoken stored name or company name, the system will provide a control signal to a telephone in the vehicle for automatically dialing their number.

Systems embodying the present invention include means for storing data representing command words employed to perform control functions for vehicle accessories, means for detecting spoken command words and providing data corresponding thereto. Means are provided for comparing the data to determine if a word match has occurred and providing a selected control output signal in such event. In a preferred embodiment, a microprocessor is employed and is coupled to audio input and output devices for receiving and transmitting to the user voice controls and conformational prompts. The microprocessor is coupled by interface circuit means to a plurality of devices to be controlled including for example, a cellular telephone, a radio receiver and the like. Also, in a preferred embodiment a display and control panel is provided to selectively provide visual prompts to the operator and a manual control.

Thus, the present invention contemplates the utilization of a programmable electronic system for providing voice controlled operation of a plurality of peripheral devices as well as the operation of such system through the program control to provide a greater accuracy in the recognition of voice commands as well as ease of operation. These and other features, objects and advantages of the present system and its method of operation will become apparent upon reading the following description thereof together with reference to the accompanying drawings in which:

DETAILED DESCRIPTION OF THE PREFERRED EMBODIMENT

Figure 1:
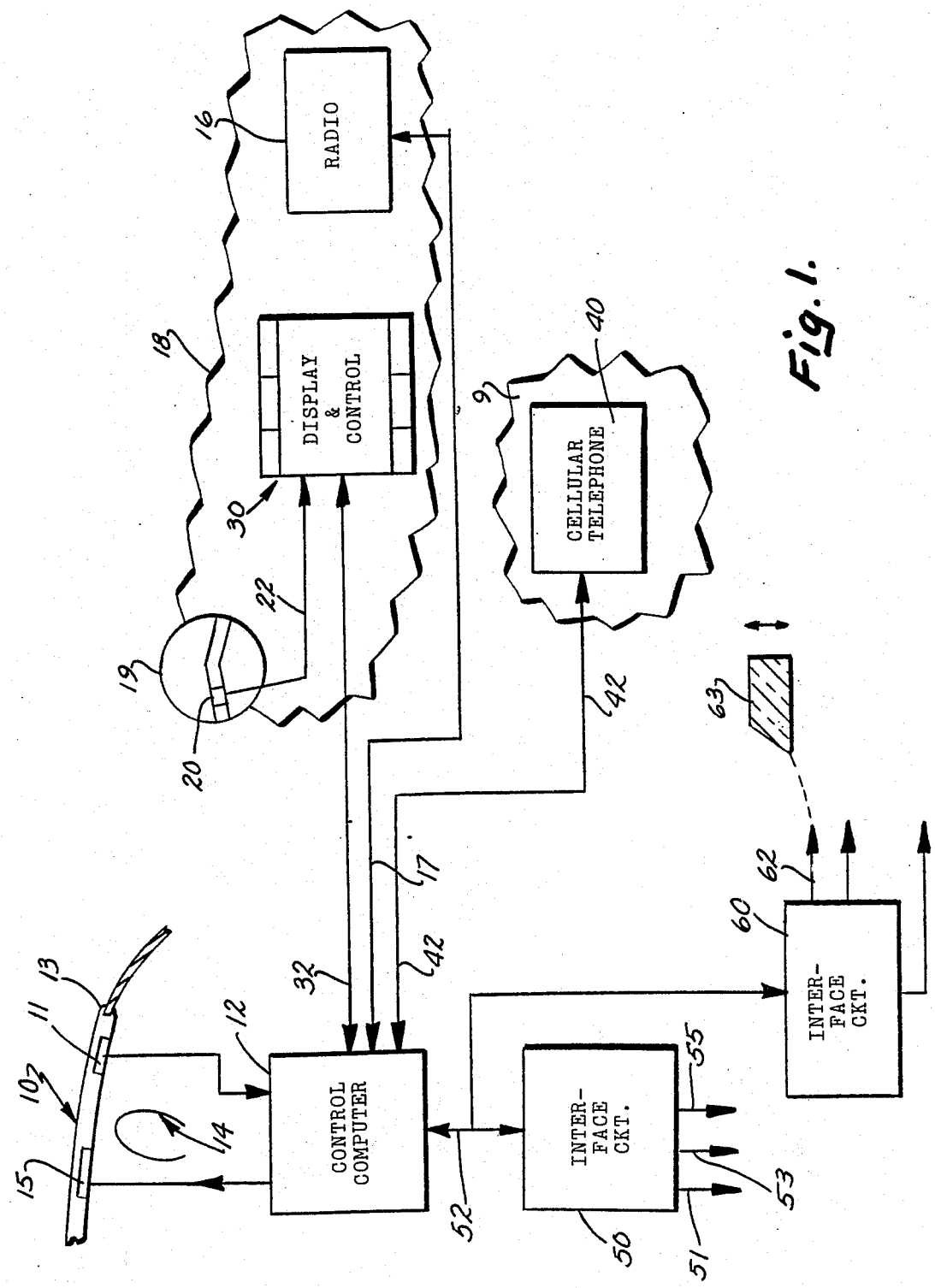
FIG. 1 is an electrical circuit diagram in block form of a system embodying the present invention and showing schematically locations of certain of its elements in a vehicle.

Referring initially to FIG. 1 there is illustrated partially in pictorial form the installation of the voice actuated system embodying the present invention. The system is particularly designed for use in a vehicle 10 such as an automobile and includes a control computer 12 which includes voice recognition circuitry as well as a microprocessor as described below for storing command word data, recognizing voice command words and providing corresponding control output signals for a variety of vehicle accessories. The control computer receives spoken input command words from a directional microphone 11 mounted in the headliner 13 of a vehicle 10 preferably above and forward of the mouth 14 of the vehicle operator and aligned in front of the operator. The microphone 11 preferably is a directional microphone and provides electrical signals to the control computer 12 representing word commands spoken by the operator. Computer 12 is coupled to a speaker 15 for providing to the operator audible prompting and other information during operation of the system. Speaker 15 may, like microphone 11, be located in the headliner of the vehicle. Computer 12 also is coupled to a remotely controlled radio 16 mounted in the dashboard 18 of the vehicle 10 by a serial data link 17. Radio 16 is a commercially available Delco Model No. 16034804ETR.

Vehicle 10 includes a steering wheel 19 on which there is mounted a push-button switch 20 which is also coupled to the control computer 12 by conductor 22 and, as described in greater detail below, is employed by the operator to initiate a listening window for the control computer for receiving spoken command words from the operator and also as an end-of-function control to interrupt the execution of a function. The control computer is coupled to a combined display and control panel 30 described in greater detail in connection with FIGS. 3 and 13 below. Two separate two wire serial RS232 data links 32 couple the display and control panel 30 to computer 12. Another peripheral device which is coupled to the computer is a cellular telephone 40 which is a commercially available telephone manufactured by Motorola model Dyn-A-Tac 6000. A three-wire synchronous data link 42 couples the telephone 40 to computer 12. The telephone preferrably is mounted within the armrest console 9 of the vehicle. One such mounting arrangement is disclosed in U.S. patent application Ser. No. 762,879, entitled Mobile Telephone Mount for a Vehicle and filed on Aug. 6, 1985.

Other peripheral devices are coupled to control computer 12 through first and second interface circuits 50 and 60, respectively which are coupled by serial RS232 data links by a common RS232 data link 52. Interface circuit 50 includes control output lines 51, 53 and 55, respectively which are coupled to for example, a climate control circuit for a General Motor's vehicle, a trunk lock control, and a gasoline lid lock control, respectively. Similarly, interface circuit 6 shown in greater detail in FIG. 2 includes a variety of output conductors including output 62 which is associated with the control of one of the vehicles power windows 63 shown pictorially in FIG. 1.

Thus the control computer 12 is coupled directly to digital devices such as the radio 16 and cellular telephone 40 through data links which utilize the control code format for these digital devices and is coupled to conventional control devices of the vehicle through suitable interface circuits 50 and 60. The interface circuits may include their own microcontroller such as circuit 60 now described in connection with FIG. 2.

Figure 2:
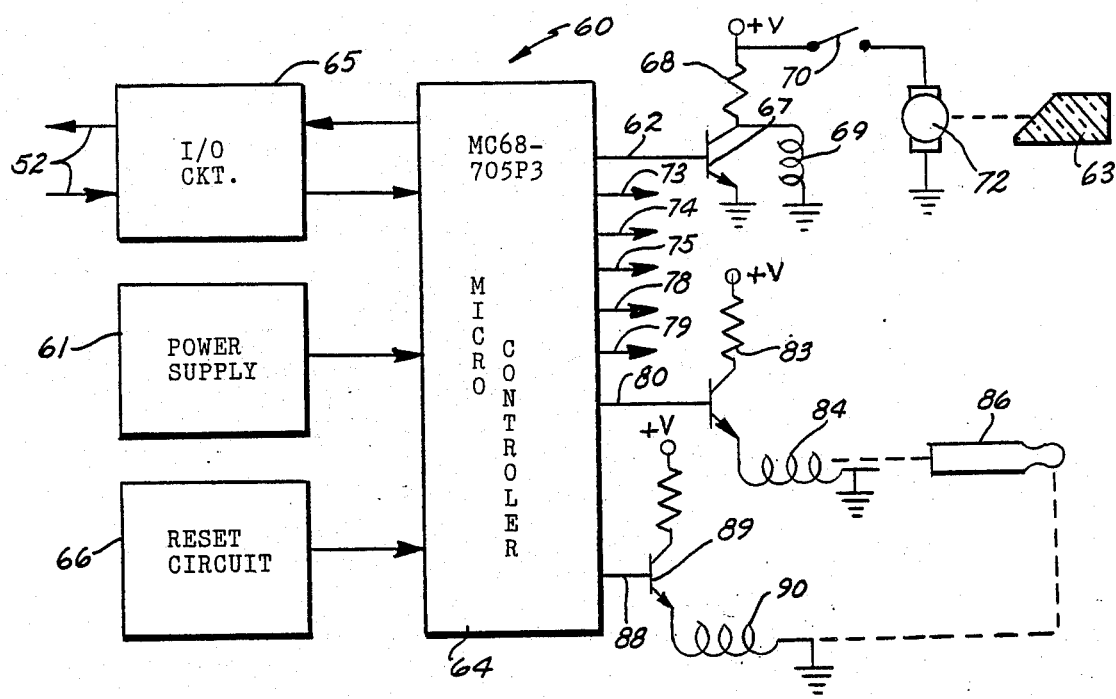
FIG. 2 is an electrical circuit diagram partly in block and schematic form of one of the block circuit elements shown in FIG. 1.

Referring now to FIG. 2 there is shown interface circuit 60 of FIG. 1 an as seen in FIG. 2 includes a microcontroller 64 which is a commercially available type MC68705P3 coupled to the serial link 52 by means of an input/output circuit 65 which is a buffer amplifier. Interface circuit 60 also includes a regulated power supply 61 and a reset circuit 66 which resets the micro controller in the event the voltage supply drops below a predetermined level. Circuit 64 includes a plurality of outputs such as output 62 which actuates power window 63 by means of a solid state switch such as a transistor 67 coupled to a +V supply through resistor 68 and having its collector-to-an emitter current path coupled in parallel to a relay coil 69 having a switch contact 70 which selectively couples the +V supply to a motor 72 for operating the power window 63. The motor controlling switch, relay and motor interconnection is simplified for the sake of brevity. Typically a double pole/double throw relay would be employed to reverse the polarity of voltage applied to the motor 72 so that a single motor ca be used for both raising and lowering the window. Output conductor 62 and conductors 73, 74 and 75 all provide logic "1" or logic "0" outputs to the solid state switches for controlling the four windows of a vehicle.

Outputs 78 and 79 apply a logic "0" or a logic "1" signal each in the preferred embodiment to memory seats of for example General Motor's vehicles which have a control circuit which is responsive to the "0" or "1" on either of the lines 78 or 79 to move the seat to one of two programmed positions. The microcontroller 64 also includes an output terminal 80 coupled to the base of a NPN transistor switch 82 having its collector coupled to the +V supply through a resistor 83 and the emitter coupled to a solenoid coil 84 for actuating a door lock arm 86 for locking the vehicle doors. Similarly, an unlocking signal is applied from output 88 of micro controller 64 to a solid state switch 89 through a second solenoid coil 90 coupled to arm 86 for moving arm 86 in an opposite direction. The solid state switches 82 and 89 are coupled to a pair of such solenoids 84 and 94 for each door lock to be so actuated by the interface circuit. Interface circuit 50 is similar to interface circuit 60 in providing signals for the vehicle accessories to be actuated by the control computer described in greater detail below in connection with FIG. 4. Circuits 50 and 60 may include buffer amplifiers between the outputs of the microcontroller and the solid state switches or other higher current devices as is conventional. The display and control circuit 30 coupled to computer 12 is now described in connection with FIGS. 3 and 13.

Figure 3:
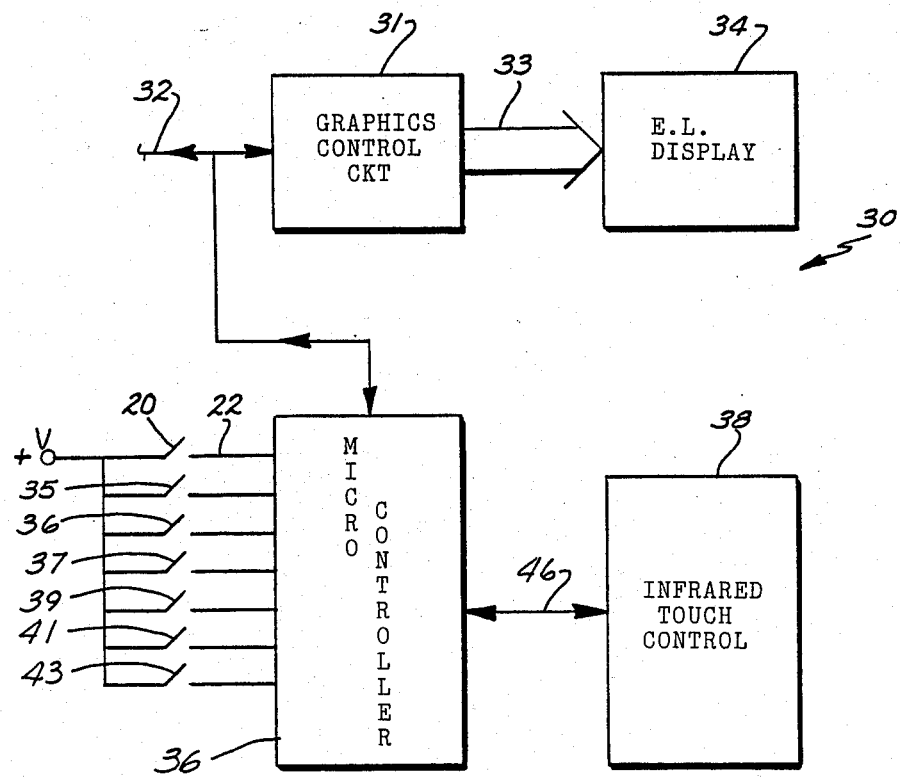
FIG. 3 is an electrical circuit diagram in block and schematic form of another of the block circuit elements shown in FIG. 1.
Figure 13:
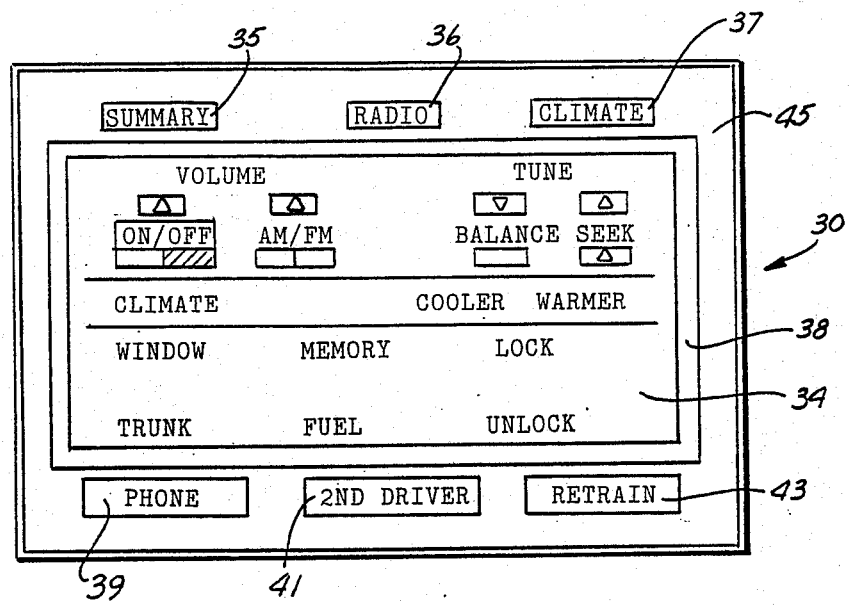
FIG. 13 is a front elevational view of the display and control panel showing a predetermined display output thereon.

Referring to FIG. 3, the display and control circuit 30 is shown and includes a generally flat rectangular electroluminescent (EL) display panel 34 also seen in FIG. 13 which is coupled to a graphics control circuit 31 by a plurality of interconnecting conductors 33. The input of the graphics control circuit is coupled to the control computer 12 through a two wire serial data link 32. The EL display is a commercially available display having dimensions of approximately 7"×10" and is available from Planar Systems The display includes a matrix of 256 by 512 pixels and receives its control information from the graphics control 31 also a commercially available unit from Deeco Graphics. The display is employed to provide the alpha numeric display information as shown for example in FIGS. 13, 19–21 and 25 for a variety of control functions of the system. One of the two wire communication data links 32 is also coupled to the input of a 68705 micro controller 36 which also includes a power supply and reset circuit as did circuit 64 in FIG. 2. The single pole/single throw push-to-talk switch 20 is coupled to one input of the microcontroller as are six additional push-button switches, 35, 36, 37, 39, 41 and 43, which are the summary, radio, climate, phone, second driver and retrain switches located above and below the display panel 34 respectively as best seen in FIG. 13. Thus, three of each of the switches are located above and below the panel and provide some of the primary control signals for functions of the system as described below. The microcontroller 36 is also coupled to the infrared touch control which is a commercially available unit from Carrol Touch Company and comprises a rectangular frame 45 (FIG. 13) which has on adjacent edges a 32 by 64 array of infrared light emitting diodes across which there are located an aligned same number of photo detectors. The control 38 thereby provides a gridwork of infrared sequentially switched light beams which scan across and in front of the face of the display 34.

For purposes of the application of control in the present invention, the physical 7"×10" space defined by the display 34 and scanned by the infrared grid beam is divided into a 5×5 matrix to provide 25 switch locations for operator manual actuation of functions indicated on the display by simply touching the display function which is outlined and therefore is a switch actuated control. Pressing the display panel 34 at an assigned location of a switch identified by a display indicia such as the word "on" as shown in FIG. 13 will interrupt the infrared light beams at that location thereby providing a signal to the microcontroller 36 through the interconnecting serial RS232 data link 46 which in turn provides a signal to the control computer for providing the control function actuated. Having described the interface and peripheral circuits and devices of the system, a description of the major components defining the control computer is presented followed by its programming for operation of the system.

Figure 4:
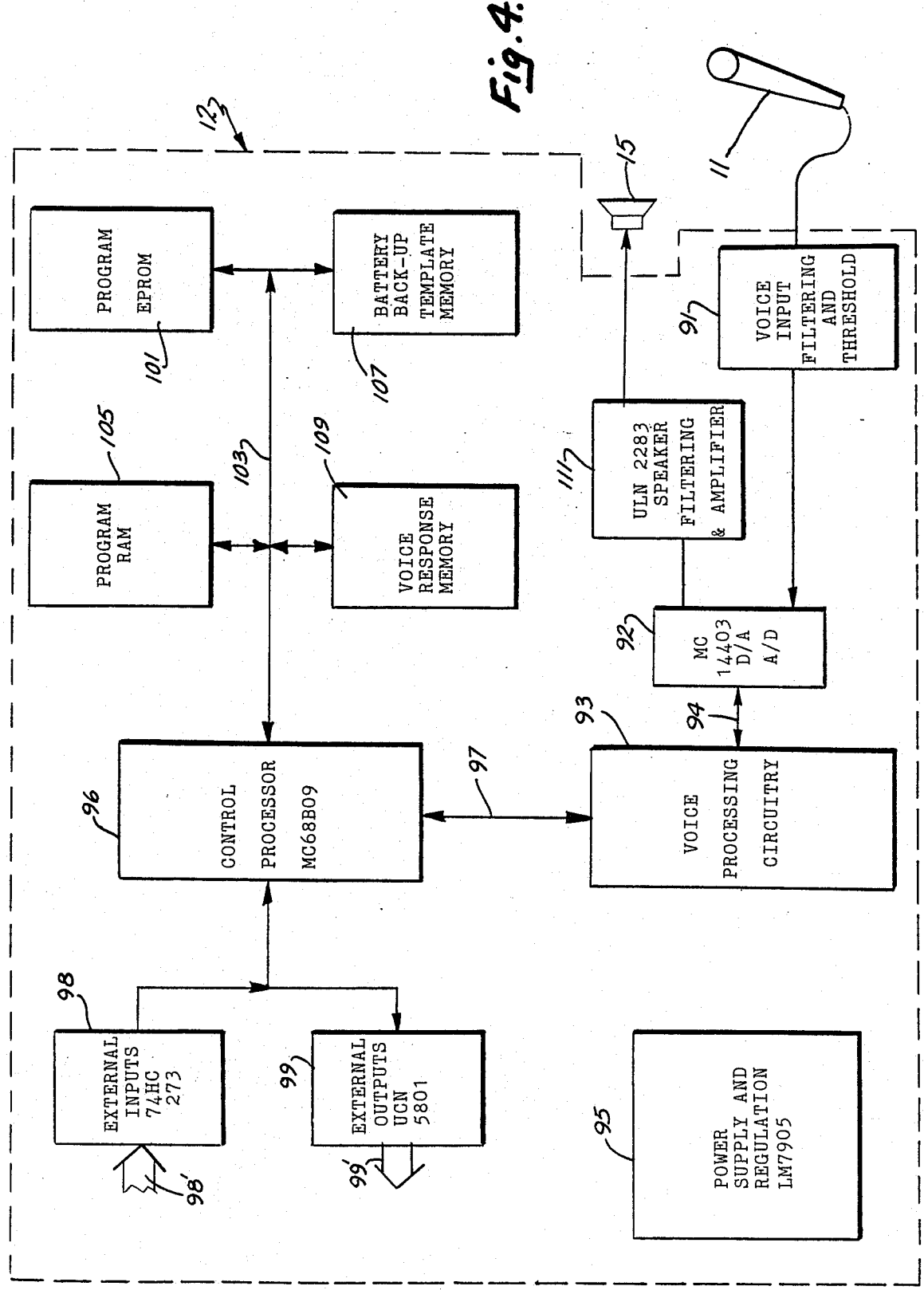
FIG. 4 is an electrical circuit diagram in block form of the control computer shown in FIG. 1.

The major constituent elements of the control computer 12 are shown in FIG. 4 which also includes the microphone input and speaker output amplifiers. The microphone 11 for receiving spoken command words from the vehicle operator is coupled to a voice input filtering and threshold circuit 91 which provides a frequency response of about 100 Hz to 7000 Hz and provides a preset gain. Circuit 1 also includes a threshold level circuit of conventional design to mute the output until the input level reaches a predetermined threshold level indicating that spoken commands are being received by the microphone 11. The analog audio output signal from circuit 91 is applied to a code/decode (CODEC) circuit 92 by an interconnecting conductor. The CODEC circuit converts the analog information into a digital format. In the preferred embodiment CODEC circuit 92 was an MC14403 commercially available integrated circuit chip and has its output couple to a voice processing circuit 93 by means of a 4 conductor data link 94. Voice processing circuit 93 comprises the electrical circuitry which converts the training analog audio input information into voice prints or word templates for subsequent comparison with voice commands. Each word of the template is a digitized analog signal comprising an average of 162 bytes of information with each byte being 8 bits. In the preferred embodiment of the invention, the system is capable of storing up to 72 individual word templates although naturally this number can be greater or larger depending upon the memory capacity employed. The voice processing circuitry 93 is manufactured by Votan of Fremont, Calif. and can be of the type generally disclosed in U.S. Pat. No. 4,415,767 the disclosure of which is hereby incorporated by reference. Other circuits which digitize voice analog information also could be employed.

Each of the various block circuits shown in the FIG. are provided power from a suitable power supply 95 with interconnections being deleted for the sake of simplicity. The power supply in the preferred embodiment includes an LM7805 and a LM7905 providing + and −5 volt output power respectively, for the digital circuits involved. The voice processing circuit 93 is coupled to the control processor 96 which is a commercial available integrated circuit MC68B09 via an 8 line data link 97. The control processor receives external inputs through an interface circuit 98 which is a 74HC273 Commercially available integrated circuit having an 8 bit data input line 98' which includes inputs from the display control 30, radio 16, etc. An interface output circuit 99 comprising a commercially available Sprague UCN5801 having a 16 bit output 99' couples circuit 96 to the radio, to the cellular telephone, to the external interface circuits 50 and 60, to the display and control circuit 30 as seen in FIG. 1.

The control processor 96 is controlled by a computer program stored in the program EPROM 101 which is coupled to the microprocessor through an 8 bit data link 103. Various memories are provided for the control processor 96 including a program RAM 105 for temporarily storing variables and program flags. The word templates comprising first and second stored words in the preferred embodiment for each of the command words to be spoken each being 162 bytes is stored in a lithium battery backup template memory 107 comprising a pair of commercially available HM62256 32k memories while prerecorded voice prompts are stored in an EPROM 109 voice response memory comprising a pair of 27C512 chips. Each of the memories 105, 107 and 109 are, like the program memory 101, coupled to the control processor through the data buss 103. The voice response memory 109 provides audible voice prompts to the operator through speaker 15 via the voice processing circuit 93, CODEC chip 92, and a speaker, filter and amplifier circuit 111. Ciruit 111 is a Sprague integrated circuit ULN2283 in the preferred embodiment.

Figure 19:
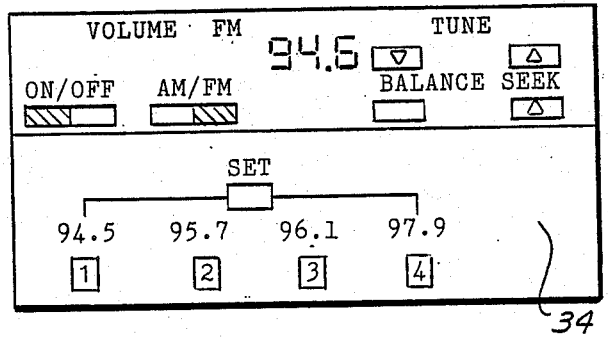
FIG. 19 is a front elevational view of the display showing the radio control prompt and information display.
Figure 21:
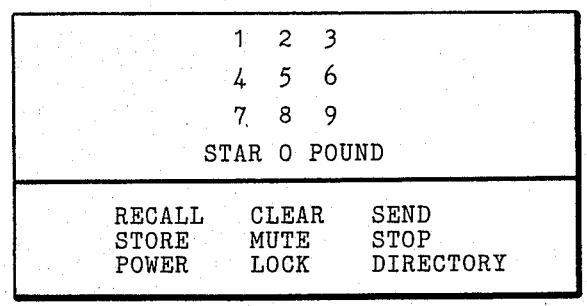
FIG. 21 is a front elevational view of the display showing one display for use of the vehicle telephone system.

Before describing the operation of the system shown in FIGS. 1–4 and 13 in connection with the program flow diagrams, a brief description of the control concepts embodied in the software and associated hardware is presented. The system is designed to be interactive with first or second operators' voices upon recognition of a preprogrammed spoken key word or by providing a listening window upon actuation of the push-to-talk switch 20 shown in FIGS. 1 and 3. This switch is preferably located on the steering wheel 19 so that it is readably accessible. In addition to verbal inputs received through microphone 11, the operator can manually select and control major functions by actuation of the control panel 30 switches 35-37, 39, 41 and 43 comprising as best seen in FIG. 13 the summary, radio, climate, phone, second driver and retrain switches. Actuation of these switches effect a screen display change with the summary display being shown in FIG. 13. Each display includes visual prompts indicating words which can be spoken for a variety of control functions. The control panel 38 comprises a switching input for the system with the display selectively outlining the location of the 25 switch locations on the 7"×10" area. Each switch location is bordered by a rectangular box in the display format provided as seen in FIGS. 13, 19 and 21 so that the user can press an outlined box to perform a control function indicated by the word in the box as shown on display 34.

The switches in the frame 45 on the upper and lower portion of the display and control panel select the primary pages of information or provide basic control functions. The page shown in FIG. 13 is the summary page providing basic information as to the radio, etc. By speaking any of the displayed words, after receipt of either the key word or an actuation of the push-to-talk switch, a more detailed display or subpage of the function selected will be sequenced onto the display for subsequent actuation by other verbal commands or by actuating the specific switches as shown for example in the radio page of FIG. 19. Thus, the system provides verbal control with backup manual control if desired.

Upon receipt of a verbal command and conformation of a correct command word, the command word which appears on the display will be displayed in reverse video format indicating to the operator the receipt of confirmed command word. The program allows train-as-you-use initial training of the system as well as selected retraining as desired or needed. The design of the program stored in EPROM 101 for such controlled operation of the vehicle accessories is now presented in connection initially with the main program flow diagram of FIGS. 5-12.

Figure 5:
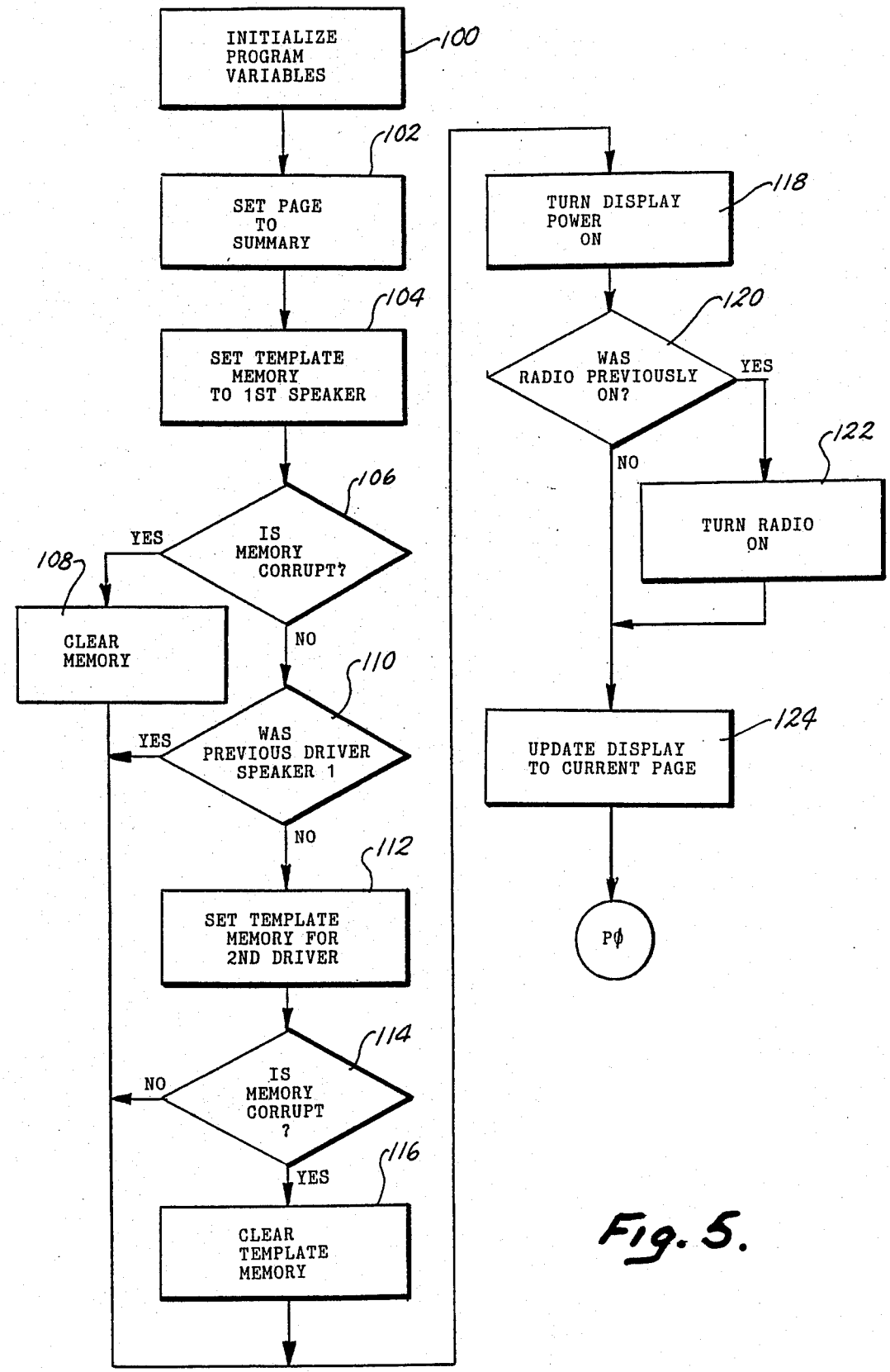
FIGS. 5-12 are flow diagrams of the main computer program for operation of the system shown in FIGS. 1-4.

Referring initially to FIG. 5, upon power-up of the system, the program variables are initialized as indicated by block 100 followed by a setting of the display and selecting the summary page information from memory which is displayed as shown in FIG. 13. This is the primary display page which contains some of the basic functions of most of the controllable accessories with exception of the phone which is controlled separately by the phone select switch 39 (FIGS. 3 and 13) or by speaking the word "phone" which is printed on the switch. Thus, the system will respond to any visual word which is either displayed on display 34 or on the switches adjacent to the display. Next, the program selects (104) the voice templates contained in memory 107 for the first speaker. The system then tests the memory (108) by adding up the bytes of memory to determine whether or not memory has been lost due to disconnecting of the battery power or the like and if the memory is corrupt, it is cleared by erasing all of the digital data representing voice templates in memory 107. Assuming the memory has not been lost, the system tests, as indicated in block 110 whether the previous driver was driver number one and if not, it selects the template memory 107 for driver number 2. Thus, the system permits utilization by two drivers with each driver having his or her own voice commands converted into digital data representing their voice template for each command word used in the system. Thus, if the previous driver was not the first driver it assumes that it was the second driver and the system selects the voice templates for driver two as indicated by block 112 and retests the memory to determine whether it is corrupt as indicated by block 114. If it was, the memory is cleared as indicated by block 116 and the display power 118 is turned on. If the memory was not corrupt in either case, the display power would be also turned on earlier as indicated by block 118. Typically, block 118 is reached by a yes decision for test 110.

With the power on, the main program initially determines whether the radio 16 had previously been actuated and if it had, the computer provides a flag to turn the radio back on as indicated by block 122. If a negative answer is determined by block 120 the display 34 is updated to the current page which normally is the summary page as previously selected by block 102. In block 124, all stored data corresponding to the current selected page, i.e. the display format, is sent to the display graphics circuit 31 (FIG. 3) through the microprocessor 96. The display format itself is contained in the program EPROM memory 101 while the variables associated with the display format and are stored in RAM memory 105. The program then moves to port P0 beginning on FIG. 6.

Figure 6:
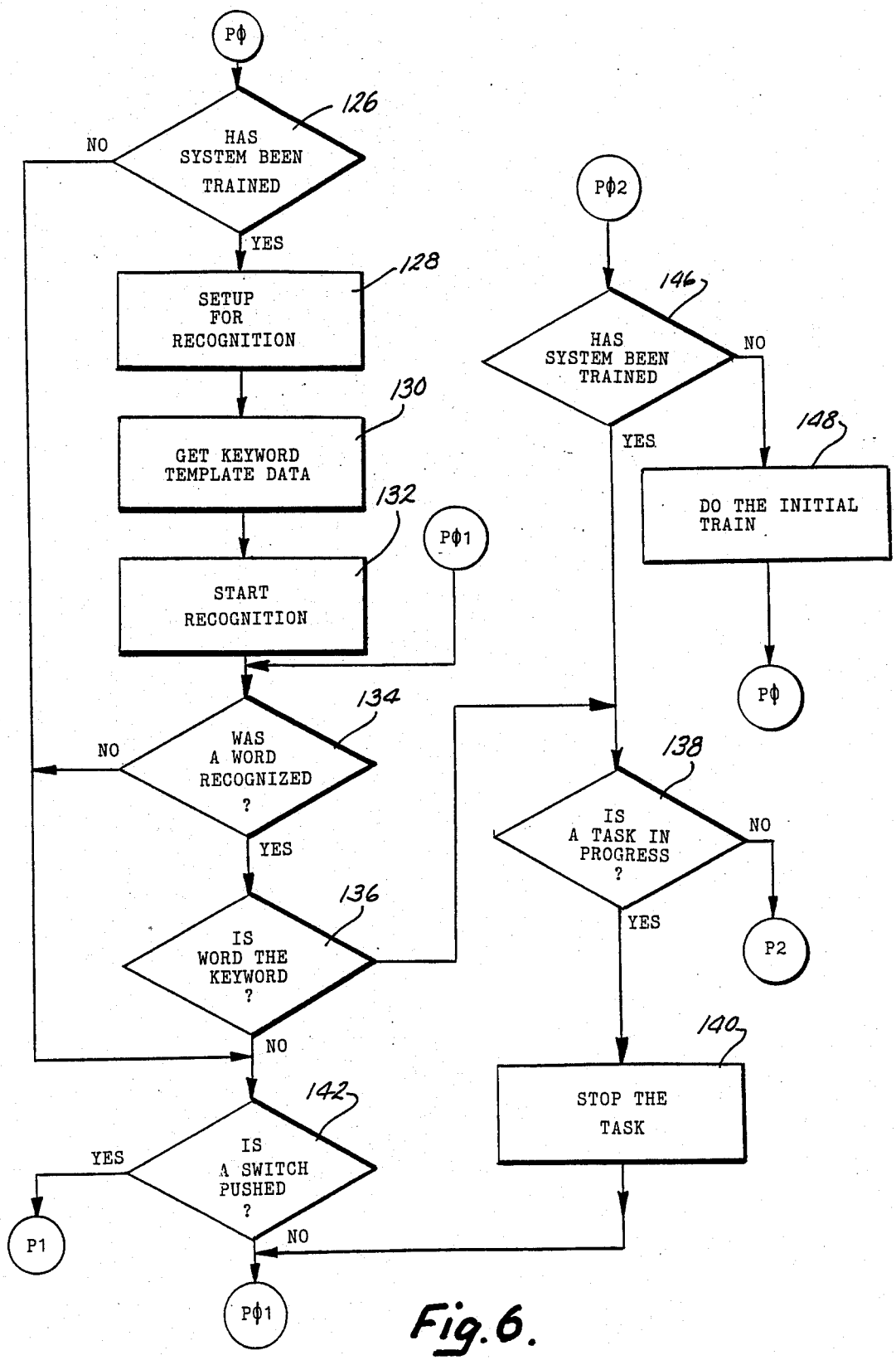

Referring now to FIG. 6, the program tests to see whether the system has been trained as indicated by block 126. With the initial use of this system, it is necessary for the first and/or second driver to train the system to recognize its voice. If the voice data has been trained in the template memory 107 a flag is set indicating training has occurred and the "yes" decision is reached in block 126. Similarly, if the memory is corrupt or no training has taken place, the flag is not set and the decision in block 126 is "no" and the program next looks to see if a control switch has been actuated such as switch 20 for the push-to-talk switch as indicated by block 142. Assuming the system has been trained for the time being, the system recalls (128) the word command digital data contained in memory 107 associated with the current page which constitutes a summary page as seen in FIG. 13. Thus, the system recalls for comparison, data corresponding to the voice of the user for each of the displayed or visible words in FIG. 13 such that the user can then operate the system by speaking these command words. In order to actuate the system, either the push button 20 is depressed or key word assigned to the system by the operator that was previously stored is spoken. Thus, the program also transfers the key word data (130) from the template memory for comparison with spoken voice commands to determine whether or not the key word is spoken. Start recognition block 132 indicates enablement of the voice processing circuit 93 to begin detecting any audible signals from microphone 11, but the system at this time is looking only for the key word to be spoken. This is tested in block 134 and 136 and if the key word is spoken and detected, the system tests to see if a task is in progress.

Figure 7:
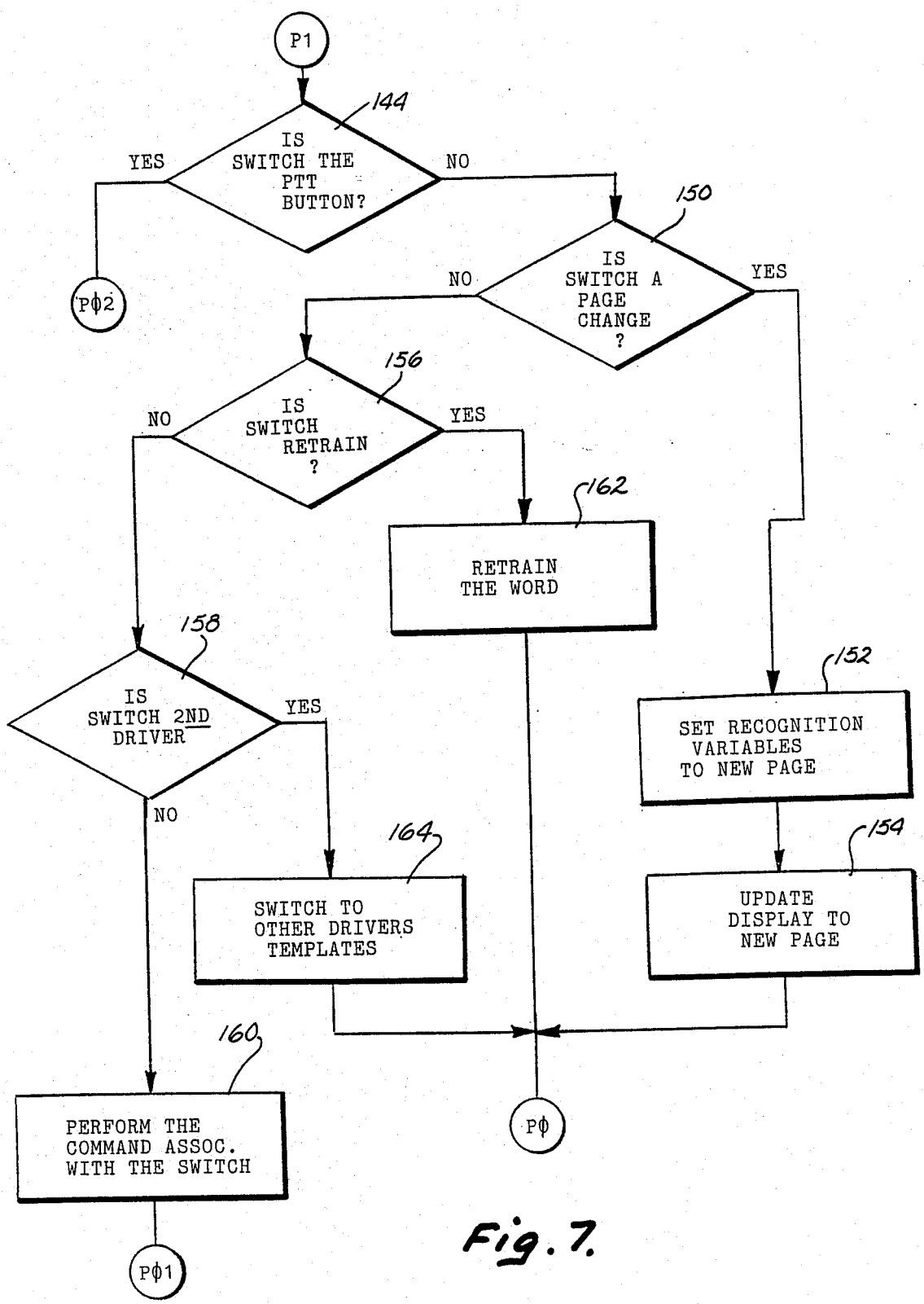
Figure 8:
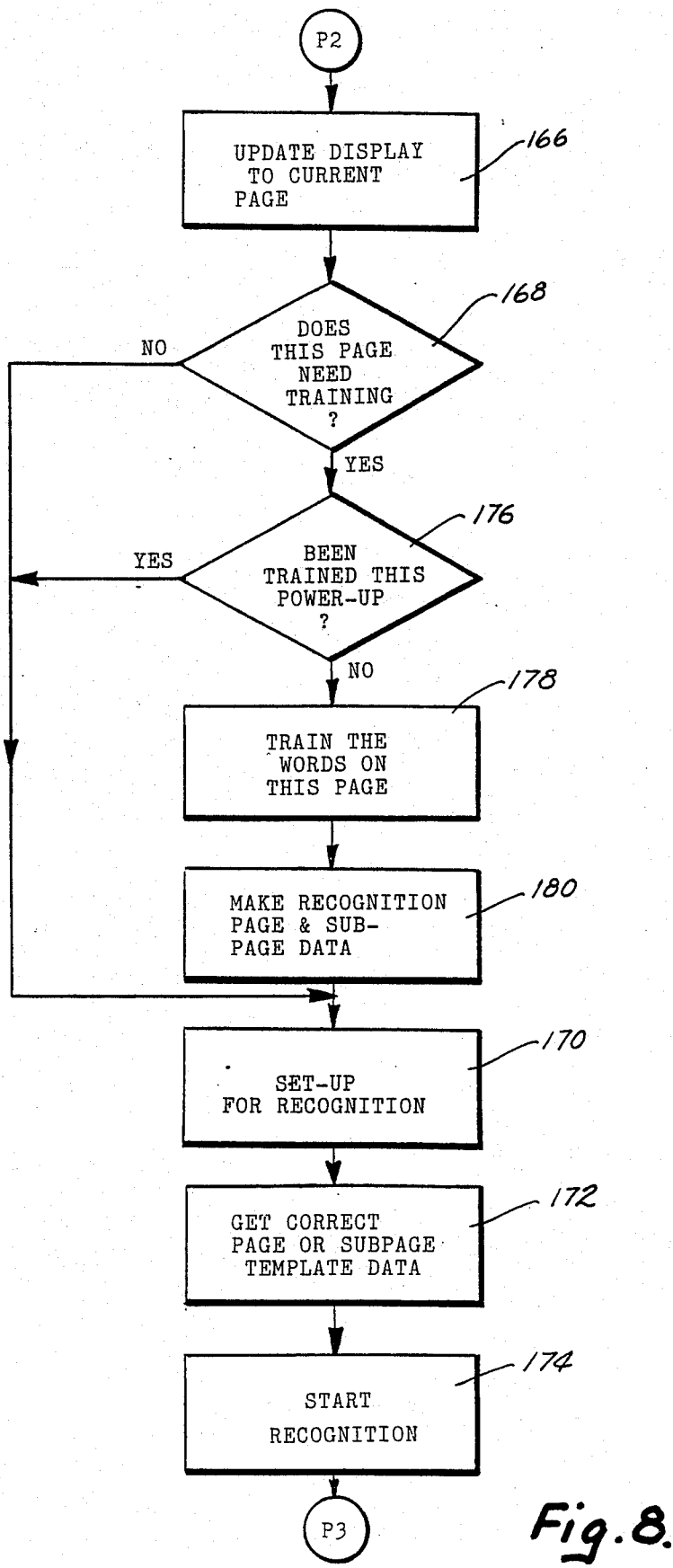

Typically, in the presently described situation where the system is being initialized for the first time, no task would be in progress and the program moves to port P2 shown in FIG. 8. If, however, under other conditions a task such as a window is being raised and the key word is detected, the task will be stopped as indicated by block 140. Thus, speaking the key word can act as a panic stop for operation of the system to stop a task in progress. In addition to identifying the key word, if a spoken word is not the key word, the system ignores any verbal command until the switch test indicated by block 142 is conducted. If a switch is actuated, the program moves to port P1 of FIG. 7. If a switch, however, is not pressed, the program cycles through the loop including blocks 134, 136 and 142 as indicated by the interconnection of port P01 until such time as either the key word is spoken or a switch is pushed. If a switch is pushed, the system tests, as indicated by block 144 (FIG. 7), whether or not the switch is the push-to-talk switch 20. If it is, the program moves to port P02 in FIG. 6 and tests to see whether or not the system has been trained as indicated by block 146. If the system has not been trained, as in the present example upon initial use of the system, initial training is undertaken as indicated by block 148 and which is now described in connection with the training subroutine shown and described in FIGS. 14–16.

TRAINING

As previously discussed, the system of the preferred embodiment can train for up to 72 different words spoken by two different operators Some of the words such as "up" and "down" are used for multiple functions such as controlling the radio volume or raising or lowering of windows. In order to prevent ambiguities the program will, as discussed below, select combinations of words in a logical predetermined pattern to make certain that the "up" that it detects will only raise the window if the word window had previously been detected. The beginning of the initial training is indicated by block 400, FIG. 14 and the initial control is to disable the speaker associated with the radio 16 so it does not interfere with the training sequence. Next, the display is changed to the summary page indicated by block 404 which page is shown in FIG. 13. The voice response from memory 109 then states, "If you would like the car to recognize your voice, please press the word summary on the touch screen", as indicated by block 406. The summary switch is switch number 35 shown in the upper left hand corner of the display and control panel 3 in FIG. 13.

A timer is then set for 5 seconds as indicated by block 408 in which the control panel is tested (410) to determine if a switch has been pressed. If the summary button was pressed pursuant to the prompt of block 406, test 412 causes the program to switch to port TR2 in FIG. 15. If the button switch pressed was not the summary button, the timer continues to decrement as indicated by block 414 and times out as indicated by block 416. The training subroutine then ends indicating that the operator did not want to train the system at the present time. If the time out isn't finished, the program cycles through the loop including blocks 410–416 until such time as the summary button is pressed or the 5 second timer times out. If the summary button is pressed indicating the operator would like to train the system, the program moves to port TR2 shown in FIG. 15.

In the training subroutine, the program first tests to determine whether this is a first training of this power-up as indicated by block 418. Memory 109 is called upon to provide the verbal prompt "Please speak louder then you would during normal conversation" as indicated by block 420. Next, as indicated by block 422, the word counter is set to word number 0 and, as indicated by block 423, it tests to determine whether the key word was trained. If the key word was not trained, the verbal prompt "Please give the car a name" will be applied through the control computer to speaker 15 asking the operator to provide a car name which will become the key word.

Next, as indicated by block 426, the operator speaks the key word and the system tests to determine whether the word was received and digitized as indicated by block 428. If it was not correctly received, it tests to determine if at least three attempts have been made to train the word and if not, the program cycles through the loop including a voice prompt "Say word to be trained" indicated by blocks 436 through 426, 428 and 438 until three attempts have been made to train the word. After three attempts, the word either will not be trainable and it is skipped or the program returns to the main program port P0. Assuming the key word was successfully trained as indicated by decisional block 428, the program moves to block 430 to increment the word counter to the next word number and then to determine whether all of the words have been programmed as indicated by block 432. Naturally, after only a few words have been programmed the decisional block 432 is a negative response and the program moves to block 434 testing to see if the word is displayed on the current pages. Thus, the program tests to determine whether or not the word is one for example in FIG. 13 which is seen on either the electroluminescent display 34 or on the switches in the frame 45 of the display and if it is contained in the preselected words corresponding to that page displayed, the program tests to see whether or not the word has been trained as indicated by block 435. If the word has been trained, the program cycles as indicated by the "yes" answer to block 430 to increment to the next word number contained on that page. If it was not trained, then the training routine continues through blocks 436, 426, 428 and 438 with the computer providing an enabling signal to the voice recognition circuit to digitize the voice information and transfer it to the template memory 107.

Figure 14:
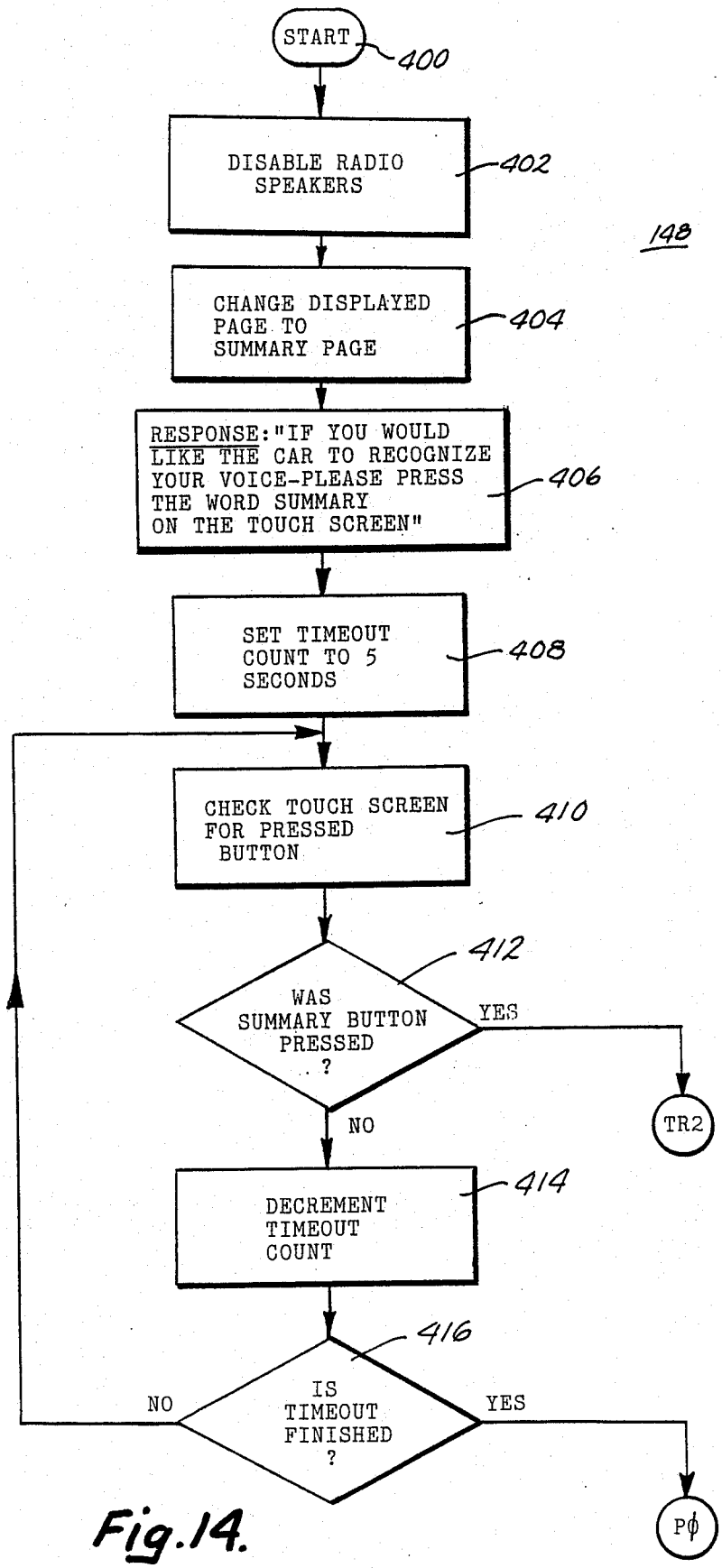
FIGS. 14-16 are flow diagrams showing the program subroutine for the training mode of operation of the system.
Figure 15:
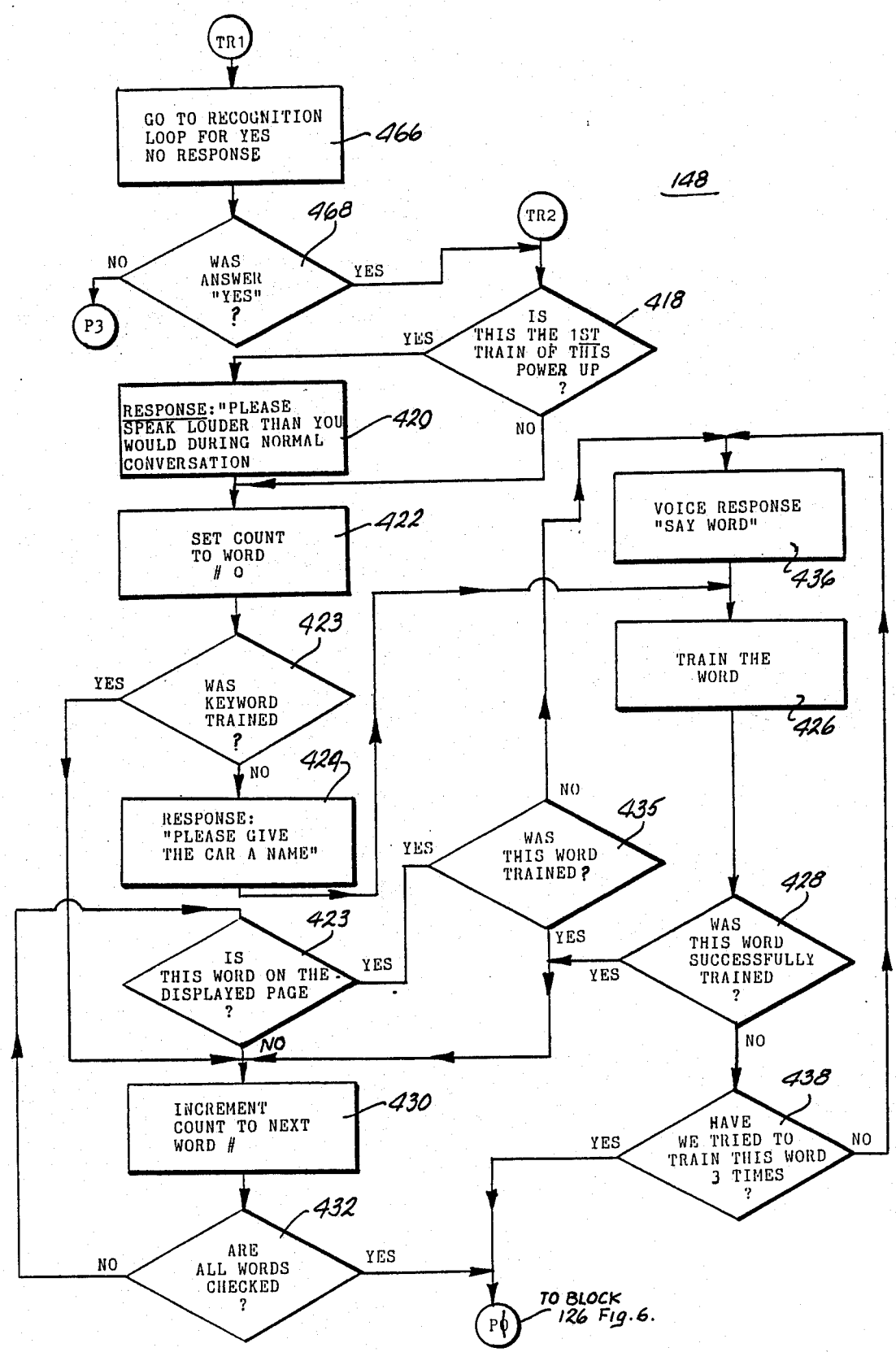

The program cycles through each of the words of the summary page which is the first page to be trained as selected by the operator during the initial phase of training and indicated by block 412 (FIG. 14). The program then returns to port P of FIG. 6 and cycles through the subroutine of FIG. 6 onto test 144 of FIG. 7. As long as the operator remains on the first page which is the summary page, no further training is necessary and therefore the system will allow use of each page which can be successively trained as desired. Once a page change is requested as indicated by actuation of one of the page buttons indicated by test block 150 of FIG. 7, the recognition variables for the new page are set into memory indicated by block 152 and the display is updated as indicated by block 154 to display the new page format. If the operator is having difficulty with the control system he or she may push the retrain button 43 (FIGS. 3 and 13) and even though the switch button is not a page change as indicated by block 150 it will be tested as indicated by block 156 to determine if it has been actuated for retraining as indicated by block 162. Further, if the switch pushed is neither the push-to-talk switch 20, a page change switch 36, 37 or 39, or the retrain switch 43, the system tests to determine if it was the second driver switch 41 and if so, the portion of memory 107 assigned to the second driver is coupled to the microprocessor for use in the event the second driver has been selected.

Continuing with the initial training, the program typically will move through blocks 152 and 154 during a training mode to port P2 of FIG. 8. Typically the radio will be the second page selected by the operator for training. In the program block 152 if one of the page switches has been actuated, i.e. summary, radio, climate or phone, the microprocessor will look at only those of the 72 words which are associated with the selected page for training into memory 107. Each of the words are given an identification number which is in the program memory 101 which is associated with each of the particular control functions controlled by the word. Thus, in the training as well as the use modes of operation, only particular words associated with the selected page will be trained and employed to provide the control function. Once the initial training of the selected page or pages have been accomplished indicated by the subroutine 148, the program proceeds to port P2 of FIG. 8 initially updating the display to assure the current selected pages displayed. The system is tested to determine if a page needs training in block 168 and assuming it does not, recognition for the words assigned to the page is set up as indicated by block 170. The program loads all of the stored and trained words corresponding to the displayed page as indicated by block 172 transferring the trained voice data from memory 107. Recognition of a spoken command as indicated by block 174 begins the main recognition routine starting at port P3 of FIG. 9.

Before discussing the main recognition portion of the program, had the page needed training as indicated by a "yes" decision in block 168 the system is tested to determine if it had been initially trained by the first power-up at block 176 and if no, the training subroutine 178 would be, as discussed above, followed by the formatting of the page and subpage data. For each page there will be a plurality of subpages as discussed below in connection for example with the radio subpage of FIGS. 19 and 20 or the telephone pages of FIGS. 20 and 25.

Figure 16:
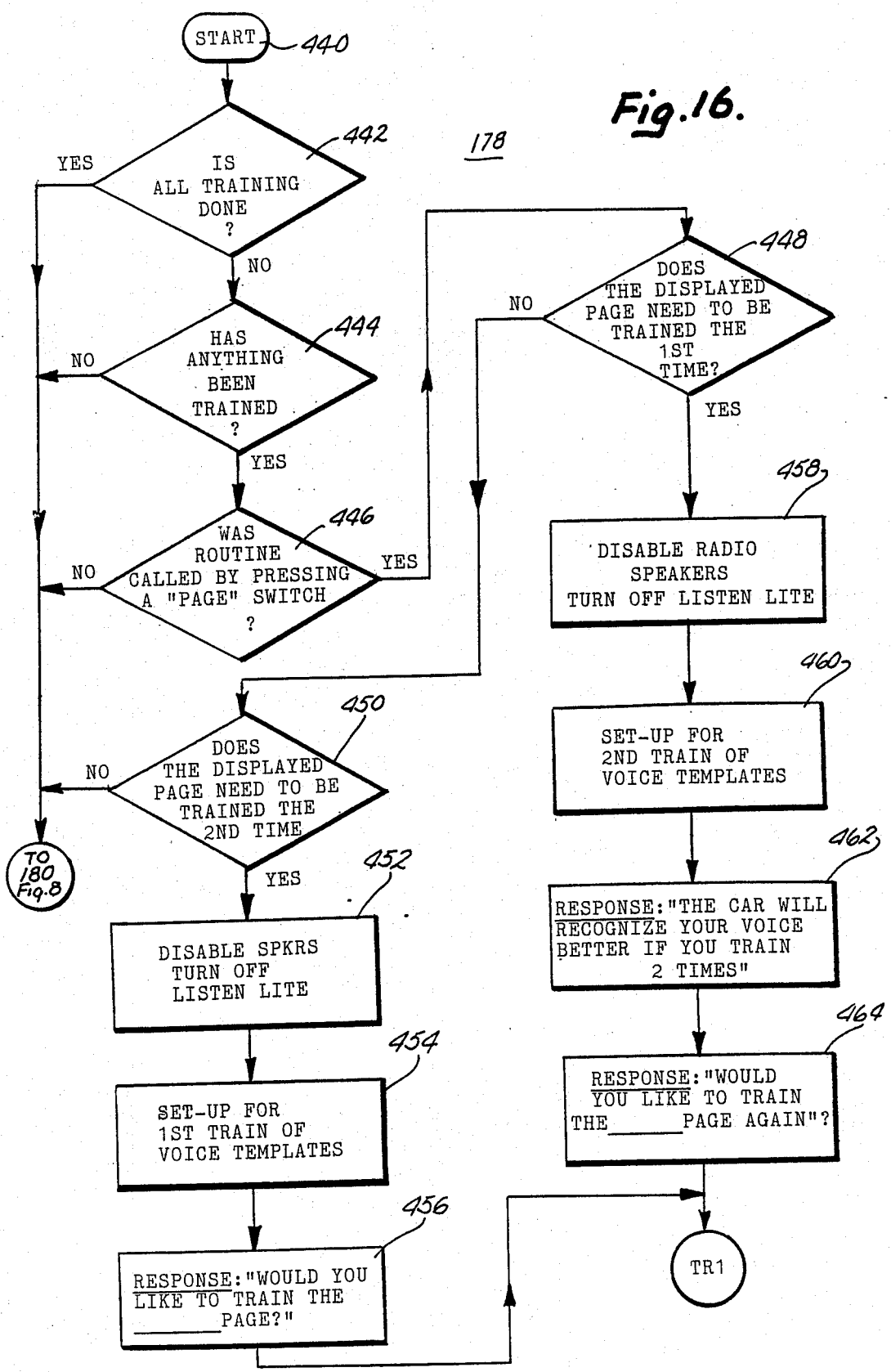

In the event the decision in block 176 indicated that training had not been previously accomplished on this power-up, the program goes to the subroutine 178 on FIG. 16 beginning at block 440 at the start and tests to see if all the training has been done as indicated by block 442. If yes, the program moves to block 180 as indicated in FIG. 8. If no, however, it tests to determine if anything has been trained as indicated by block 444 and subsequently tests to determine if the routine was called by pressing one of the four page switches as indicated by block 446. Part of the accuracy of the operation of the vehicle control system of the present invention is achieved by training each word command twice. Thus, during the training routine of FIG. 16, the program tests, as indicated by block 448, if the displayed page has been trained a second time. If not, the program proceeds as indicated to decisional block 450 to determine whether or not a displayed page needed to be trained for the first time. If so, the program disables the speakers as indicated by block 452 and assuming a page which has been actuated by block 446, for example the radio page, the program selects the word identifications associated with the radio page as indicated by block 454 for training and provides an audible prompt to the operator as indicated by block 456. The program looks for a response as indicated by block 466 (FIG. 15) to the question posed by block 456 or 464. If the response to the training question is in the affirmative, the training routine 148 is begun as indicated by the input port TR2 of FIG. 15 as previously described. If the page had not been trained twice, which is desirable but not necessary to the operation of the system, the subroutine including blocks 448–464 will be followed and as indicated by block 468 in FIG. 14, the operator has the option of training again by answering "yes" for a second time or answering "no" and ending the training routine and returning to the main recognition program of FIG. 9.

RETRAINING

Figure 17:
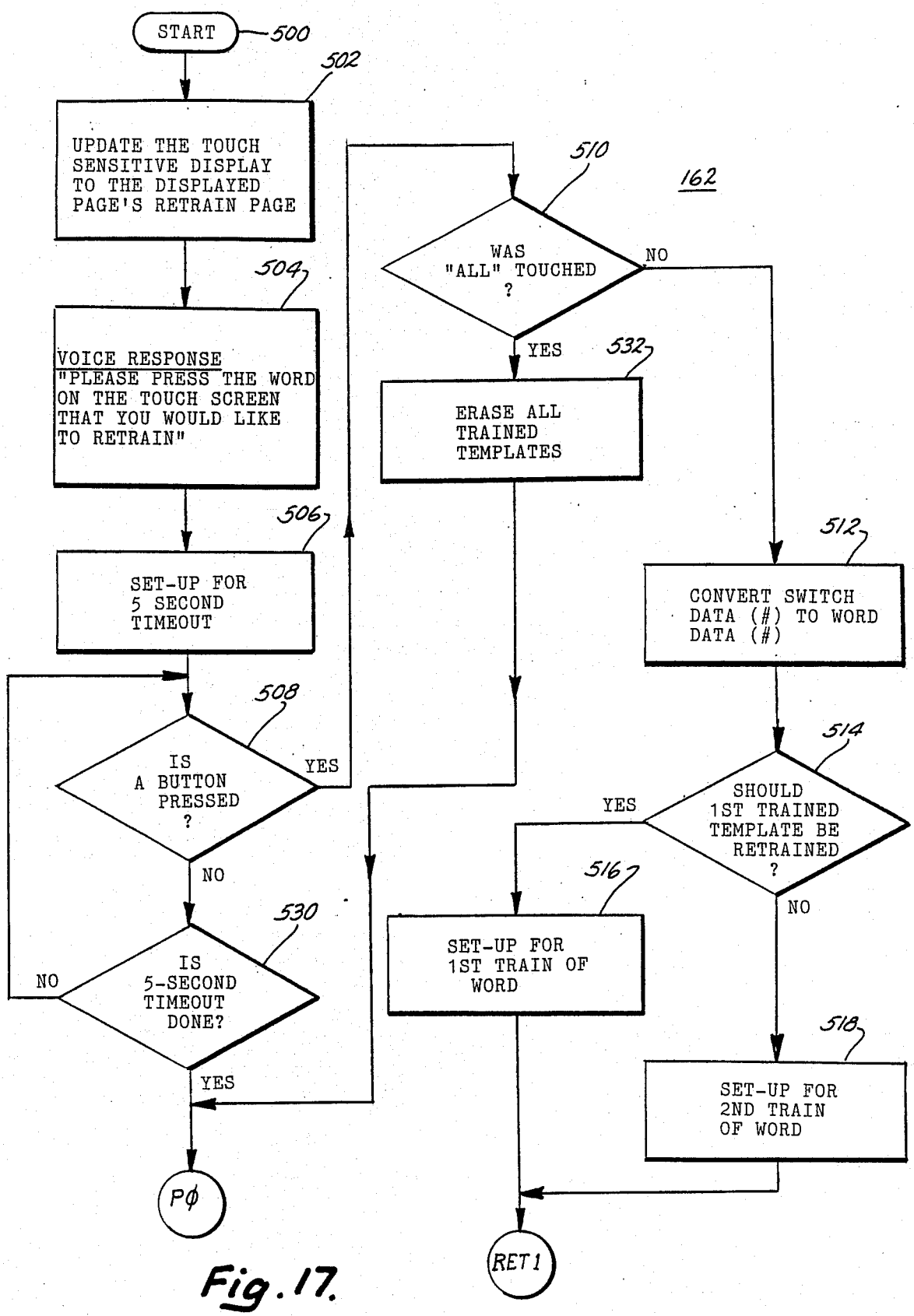
FIGS. 17 and 18 are flow diagrams for the retraining program subroutine for the system.
Figure 18:
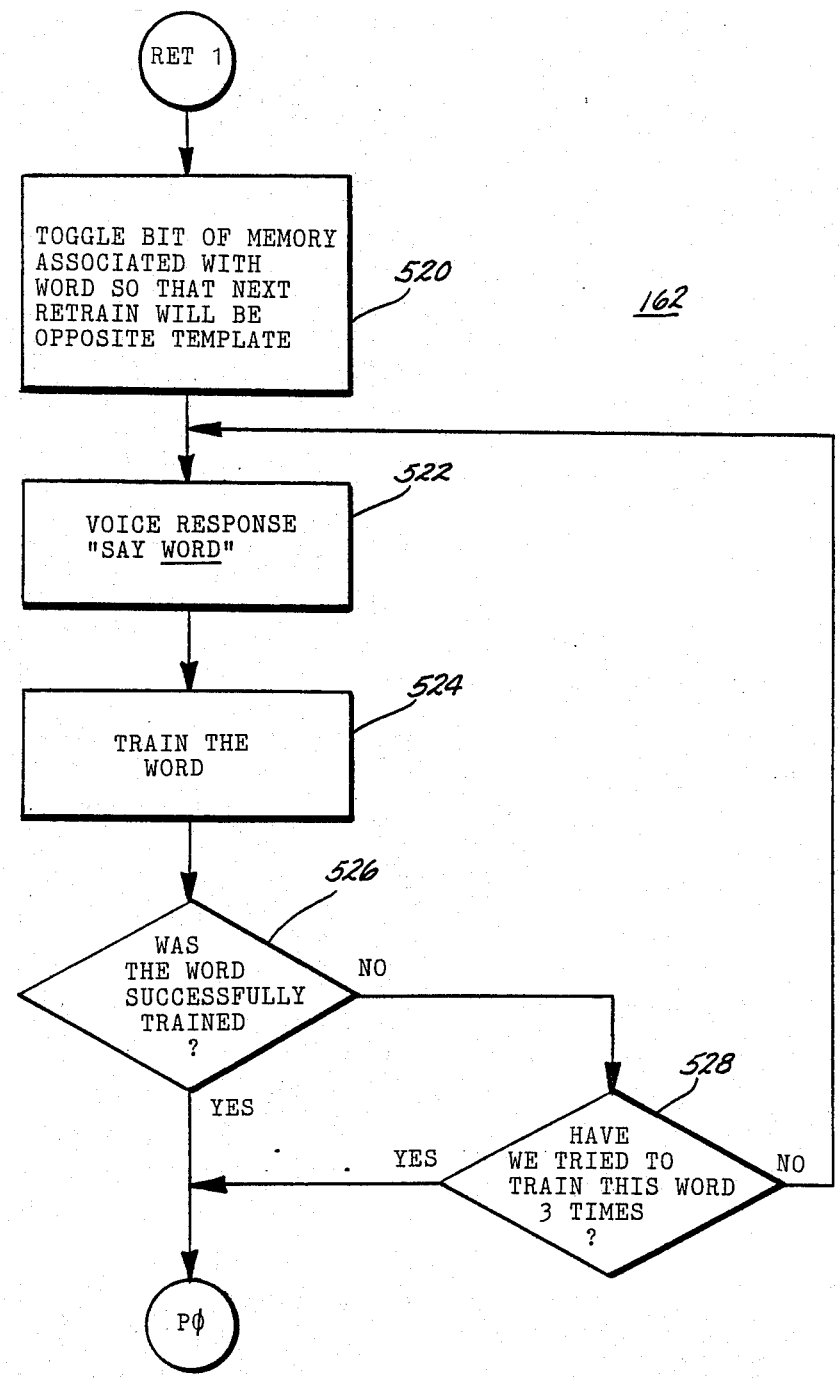

Before discussing the main recognition and the control of vehicle accessories portion of the program, a brief description of the retraining subroutine is presented which as indicated by block 168 of FIG. 7 can be recalled as subroutine 162 which is shown in FIGS. 17 and 18. Retraining can be achieved by actuating the retrain switch 43 or by pressing PTT and saying the word "Retrain" at any time the operator feels the system is not functioning with the desired accuracy due to, for example, changes in the operator's voice during a period where the operator may have a cold or an allergy or the like or whenever he or she has difficulty with a particular word recognition.

Figure 20:
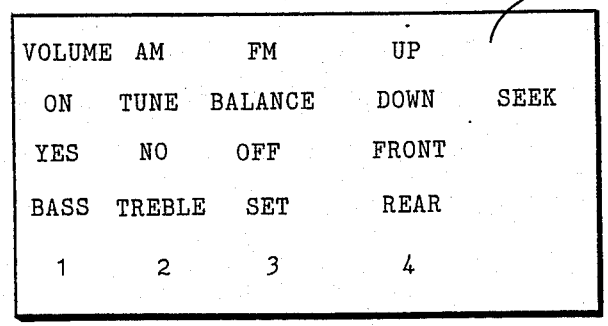
FIG. 20 is a front elevational view of the display showing the radio word retraining page display.
Figure 24:
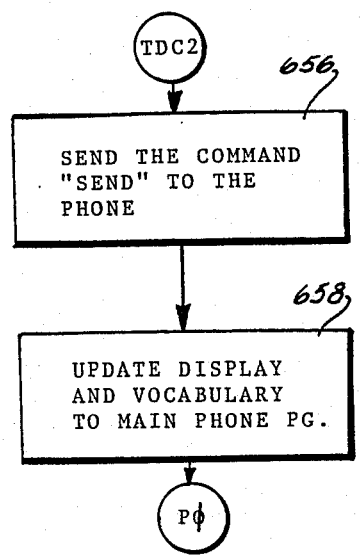
FIGS. 22-24 are flow diagrams for the computer subroutine for the telephone directory and automatic telephone dialing of numbers in the directory.

Retraining is started by block 500 of FIG. 17 and initially the display is updated to the retrain page 502 which lists the words that can be retrained on the page previously selected. One example might be for example, the radio operation retrain page which is shown in FIG. 20 and which the page can include a number of words located up to the 25 touch locations on the 5×5 array over display 34. Subsequent to the display of the retrain page, the operator is prompted as indicated by block 504 to touch the word on the display that he or she would like to have retrained. The word is aligned with one of the 25 locations of the 5×5 switching matrix control 38 and a 5 second timer of block 506 is actuated. It will allow the operator 5 seconds in which to touch one of the words which provides a control signal representing the word selected which is tested by block 508. If the summary page is being displayed, it allows the operator to retrain the entire system by actuating the displayed word "all" in block 510 typically this will not be required, however, the program allows it to be done in the summary page mode. In the present situation where the operator is retraining a word on the radio page, the program moves to block 512 where the switch location information is converted into the word number data and the program tests to determine, as indicated by block 514, which of the first or second training templates are to be trained. The hierarchy is set for training the first template firs as indicated by block 516 and upon retraining this program goes to port RET1 of FIG. 18. If the first template has already been retrained, the second template is called up for retraining indicated by block 518 and the program goes to the retraining portion of the subroutine indicated in FIG. 18. As indicated by block 520, the memory location in memory 107 assigned to the particular word touched is called up and the system prompts the operator with the statement, "Say word" (i.e. "Say volume") for whichever word had been selected. Thus, if the operator had pressed the term "volume" for the radio page, the operator would now speak the term "volume" and the word would be retrained as indicated by block 524 in the same way as previously discussed in the training routine 148. Block 526 tests to determine if the word was successfully retrained and if not, whether there had been three attempts to retrain the word. Assuming the word was successfully retrained, the program returns to port P0 of FIG. 7.

RECOGNITION ROUTINE

To begin the word recognition for control of a vehicle accessory upon the actuation of the push-to-talk button 20 (144) after passing through the steps of FIGS. 7 and 8, a 5 second timer is initiated (block 182) which illuminates a lamp on the vehicle dashboard carrying the notation "listen". This comprises a 5 second window in which the vehicle operator can respond which is tested by block 184. If a word was not recognized, the program looks to determine whether or not the push-to-talk button was in fact actuated indicated by block 186 and if not, it cycles through the loop 182, 184 and 186 until a word is recognized within 5 seconds of actuation of switch 20. Thus the program continues cycling through two relatively small loops including the key word loop previously described and the push-to-talk switch loop including blocks 182, 184 and 186 awaiting input commands indicating a control function is to be provided. If a word is recognized, the program proceeds to P5 of FIG. 10 and as indicated by block 188 looks at all recognition parameters from the voice processing circuit 93 which parameters are indicated in the table to the right of block 190 in FIG. 10. The spoken command is compared with the existing voice templates to determine for the two recorded voice prints the two closest word matches. The voice processing circuit will assign a digital number D1 from 0–255 for the closest word match W1 and a second digital number D2 for the second closest word match W2. D1 and D2, thus represent how close the detected spoken command word is to two words (W1 and W2) in the template memory 107. Ideally, W1 will be the stored word for the spoken word in the first template D1 will be 0 and W2 will be the stored word for the spoken word in the second trained template and D2 will also be 0. The closer the word recognition, the lower the numbers D1 and D2 will be. If the detected word corresponds to W1 which is the same as the second stored word template W2, there is a perfect word match (190) and the program proceeds to port P6 of FIG. 9

In FIG. 6, the program tests at 192 whether or not the successfully detected word is a page change and if so, as indicated by block 194 the program variables are set for a new page and the program proceeds to port P2 of FIG. 8. Assuming, however, in block 190 (FIG. 10) the word was not a perfect match, the system provides some unique testing based upon the digital numbers assigned to each word. First it tests to determine if D1 is less then the digital number 55. If the number is greater then 55, the program proceeds to port P3 indicating that even though a word has been recognized the word is too distant from the closest stored word to constitute a valid match. In this situation, the program returns to port P3 of FIG. 9, since a determination has been made that the detected word is not a valid command word and the system continues in the loop of FIG. 9 for the detection of the push-to-talk switch and the subsequent recognition of a word the next try.

If, however, D1 is less then 55, the system tests as indicated by block 198 whether D1 is also less then 45. If D1 is less then 45, there is a fairly high degree of confidence that the spoken command word was accurately detected and compared with a stored voice print word W1 corresponding to the spoken word. The program compares the spoken verbal command not for only the best word match, but also the second best word match and provides the match distance D1 for the first best word match and the distance D2 for the distance for the second best word match.

If the numerical distances assigned to the word numbers between the first best word match and the second best word matches are too close as tested by block 200, although a word may have been correctly identified it may be one of two words and an ambiguity may exist. In such an event, the program goes to port P7 of FIG. 11 and the listen light is turned off as indicated by block 204 and audible prompt "Did you say _" (where _is the closest match word) is audiblized in speaker 15 as indicated by block 206. If the operator responds "yes", as indicated by the block 208 test, a good match with word one has occurred. If, however, the response is "no", it is assumed since based upon the test in block 198 a good word has been detected that the word match is with word two (W2) and in either event, the program proceeds to port P6 of FIG. 9. If, however, the distances are not too close, a "Did you say" response is not necessary and as indicated by the negative reply to test 200 and the program moves directly to port P6 of FIG. 9. If D1 is between 45 and 55 as indicated by a negative response to test block 198, and the distance D2 minus D1 is less than 8, the confidence level of the existance of a correct match is not as high and the system also goes into the "Did you say" subroutine of FIG. 11 via P7.

Figure 9:
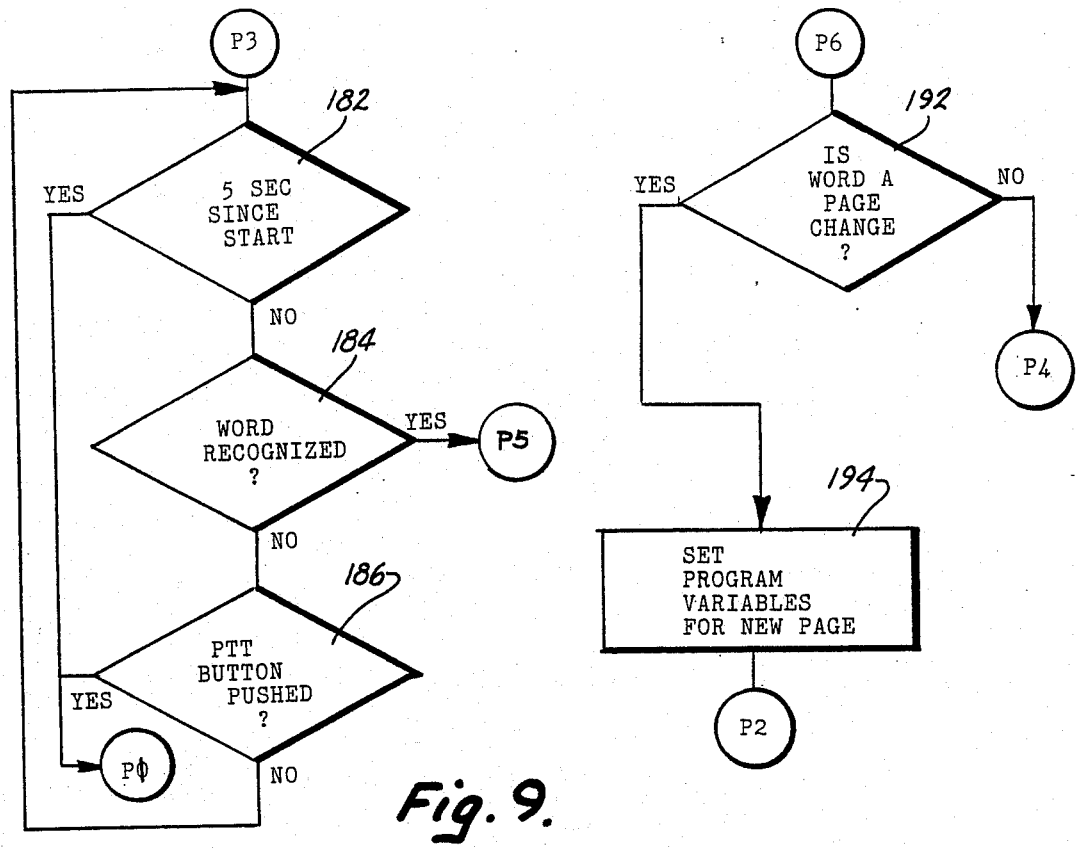
Figure 11:
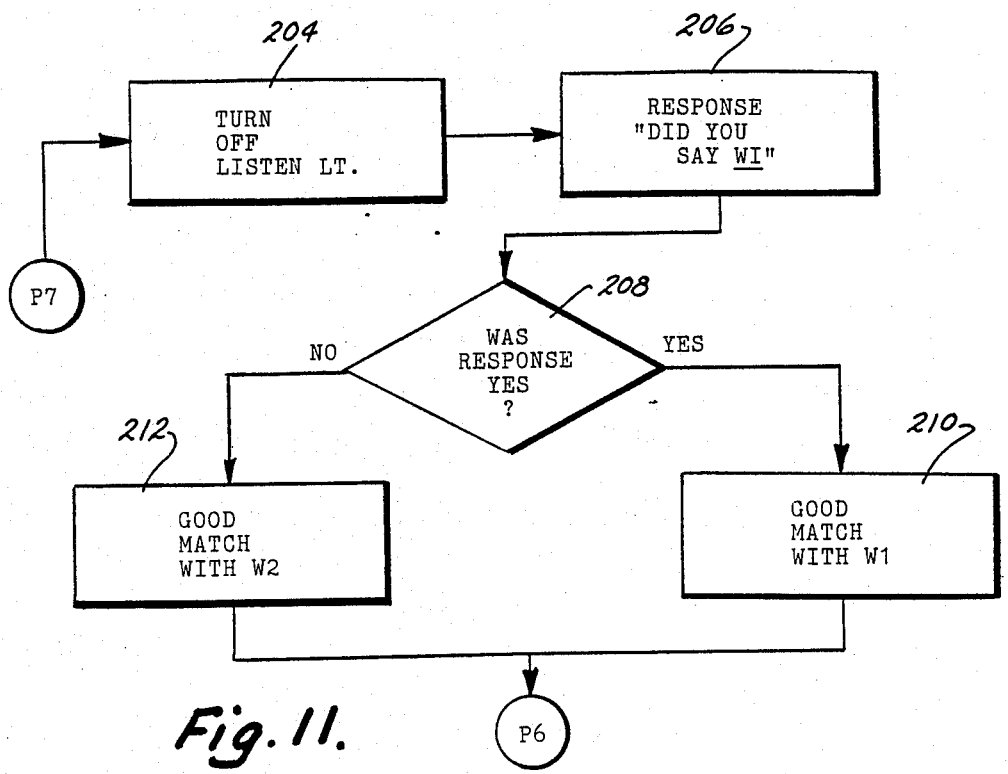
Figure 10:
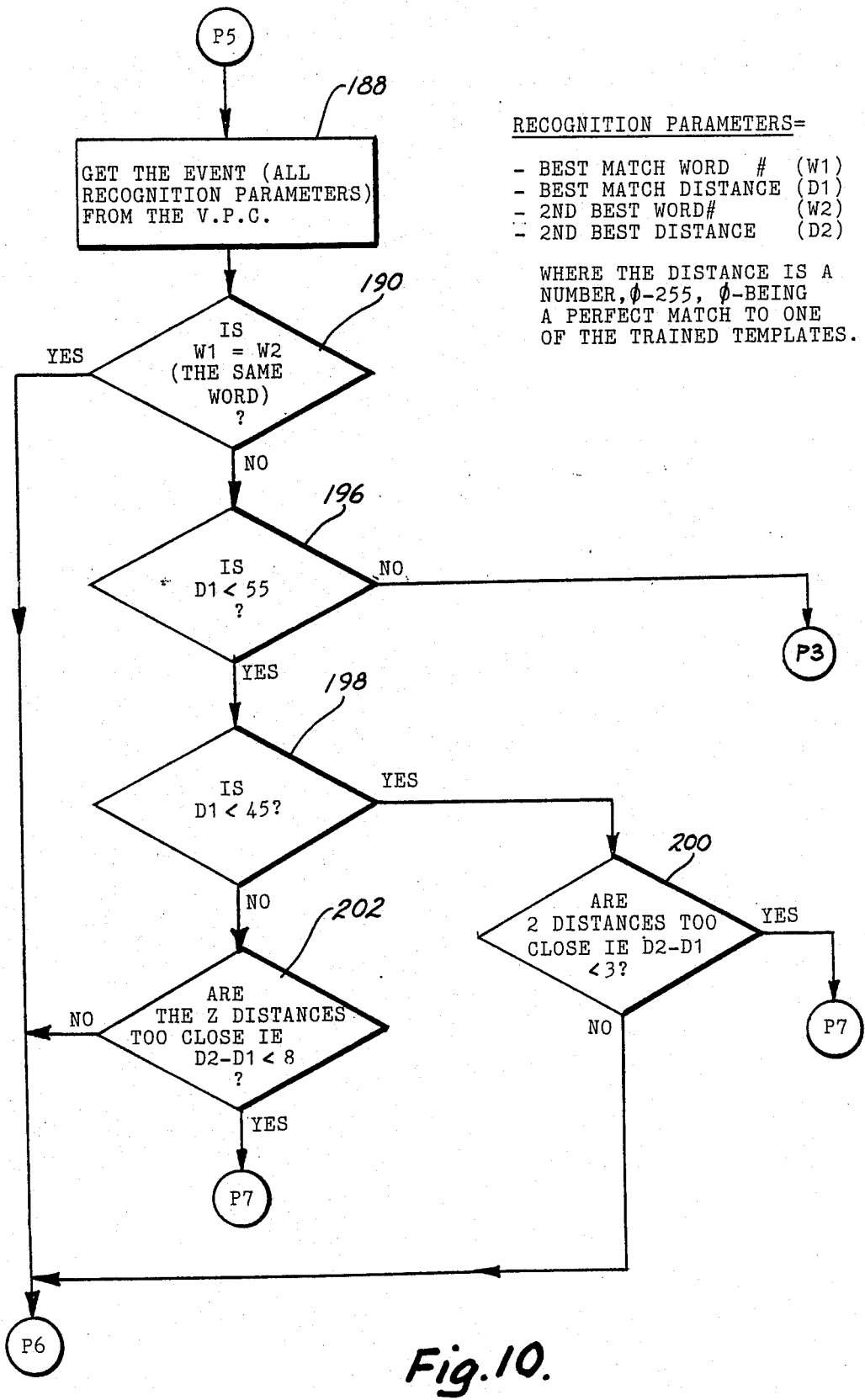

The tests of blocks 196–202 have been empirically determined to provide a high degree of reliability in providing the desired control output function when a command word is spoken. Assuming a word has been correctly matched and tested for a high degree of reliability in the match, the command associated with the word, assuming it is not a page change word, is indicated by a "no" decision of block 192, FIG. 9 is carried out by the program routine shown in FIG. 12.

Figure 12:
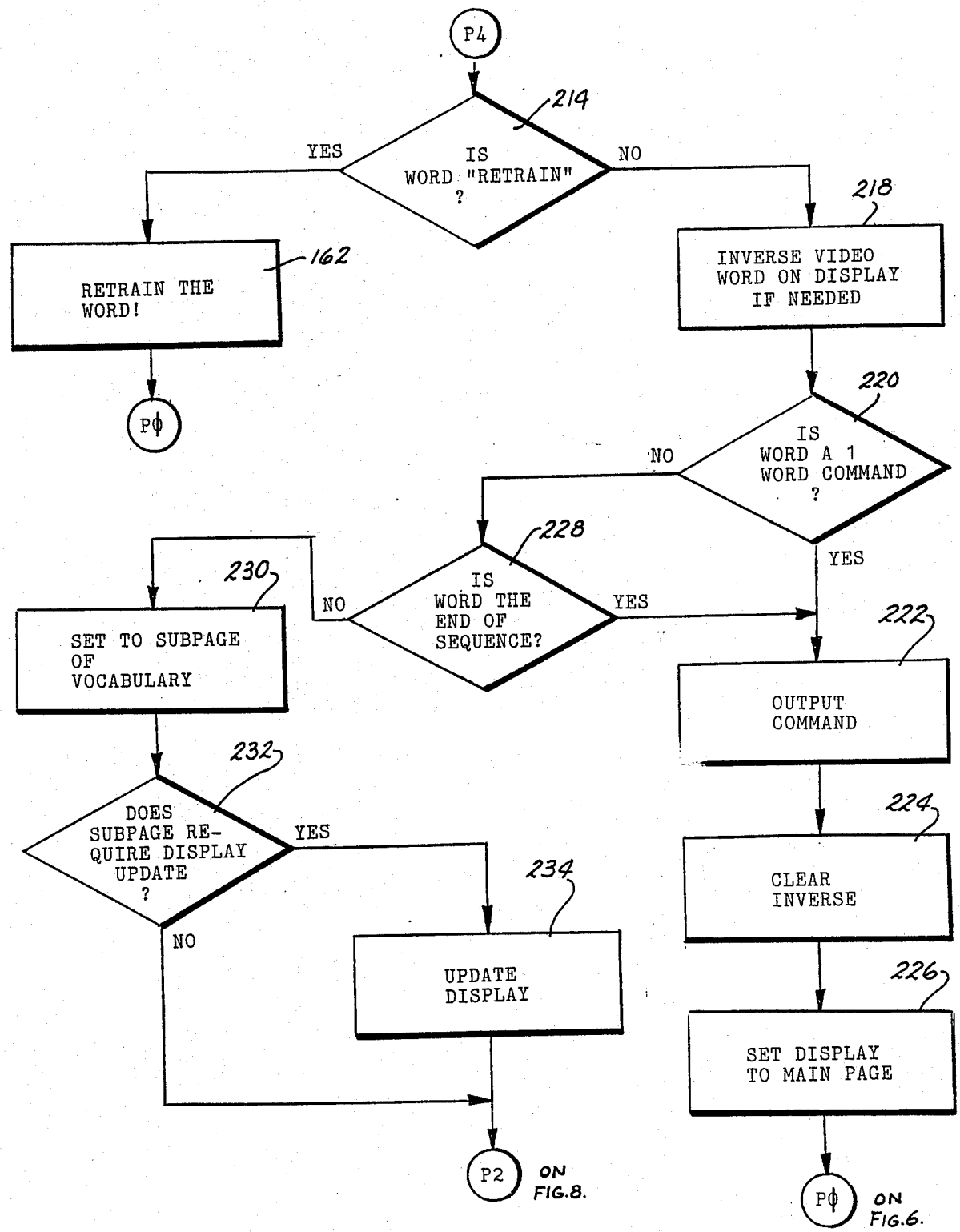

Turning now to FIG. 12, the program tests to determine whether the recognized and verified word is "Retrain" at block 214 and if it is, the retraining subroutine 162 of FIGS. 17 and 18 is conducted and the program returns to port P0. Typically, however, the word will be a command word for controlling a function of an accessory and when detected the video display of the word spoken will be inverted on the display as indicated by block 218 indicating to the operator that the word has been recognized. Next, it is determined from the stored page in which the word is stored, from the sequences contained on the page, whether or not the word is a one word command. This is tested in block 220 and if it is, a control command signal is outputted as indicated by block 222. In terms of circuit operation, the computer 12 through microprocessor 96 and interface microcontroller 64, for example, will output a binary signal to provide a control function such as raising or lowering window 63 as seen in FIG. 2. After the command has been outputted, the inversed display is cleared as indicated by block 224 and the display is returned to the main page as opposed to the subpage to which it may have previously been selected as indicated by block 226 with the program returning to P0 of FIG. 6.

In the event the word was not a one word command as indicated by a negative decision in block 220, the word is tested against the words contained in the command sequence of words to determine if it is at the end of the sequence indicating that the sequence is completed by block 228. If the sequence is completed, the command is again outputted at block 222. If the sequence is not completed such as for a command window which requires the window identification number and the up or down command to be stated, the system will set the display to a subpage of the vocabulary as indicated by block 230. Thus, for example in examining FIG. 13, which is the summary page, if the word window is spoken, the page will shift to a subdirectory display page in the computer memory displaying the numbers 1, 2, 3, 4, and "up" and "down". The display is then updated indicated by block 232 and 234 and the program continues through the word recognition sequence at port P2 of FIG. 8 until the test of block 228 is determined as for example in the window situation where the word window has been recognized and the identification "2" has been recognized for example and the final end of word sequence "down" word has been recognized. Upon completion of the command as indicated by block 226 the program moves to port P0 of FIG. 6.

Another example of a multiple page display is given in connection with FIGS. 13 and 19. FIG. 13 discloses the summary page which includes some information for a variety of functions including the radio functions of on/off, am/fm, volume up and down, tune up and down, balance, and seek station control. Each of the controlled words, volume, on, off, etc. can be spoken directly from the displayed summary page of FIG. 13 once the words have been trained to provide the limited control functions. If, however, it is desired to provide more detailed information as to the radio operation and its control, either the radio switch 36 (FIG. 3) is actuated or the word radio is spoken at which time the page is switched to the FIG. 19 display allowing for the recall of one of four preset stations by providing the further commands set 3 for example which will automatically tune the radio to the 96.1 Mhz frequency preprogrammed in the system. The radio retraining page is shown in FIG. 20 which includes the various commands used in connection with the radio control for the system.

One of the unique applications of the voice control system of the present invention is the utilization of the system to provide hands off control and telephone communications using a conventional cellular telephone 40 such as the one identified earlier. The cellular telephone preferably is the type which provides a data link to the telephone control typically located in the trunk of the vehicle and the handset located for example in the console between the front seats. The data link between the handset and the control circuit can be formatted to be controlled directly by the control processor 96 (FIG. 4) through the voice control system of the present invention. The telephone operation of the preferred embodiment invention can best be understood by reference to FIGS. 21-25 now described.

TELEPHONE OPERATION

Figure 22:
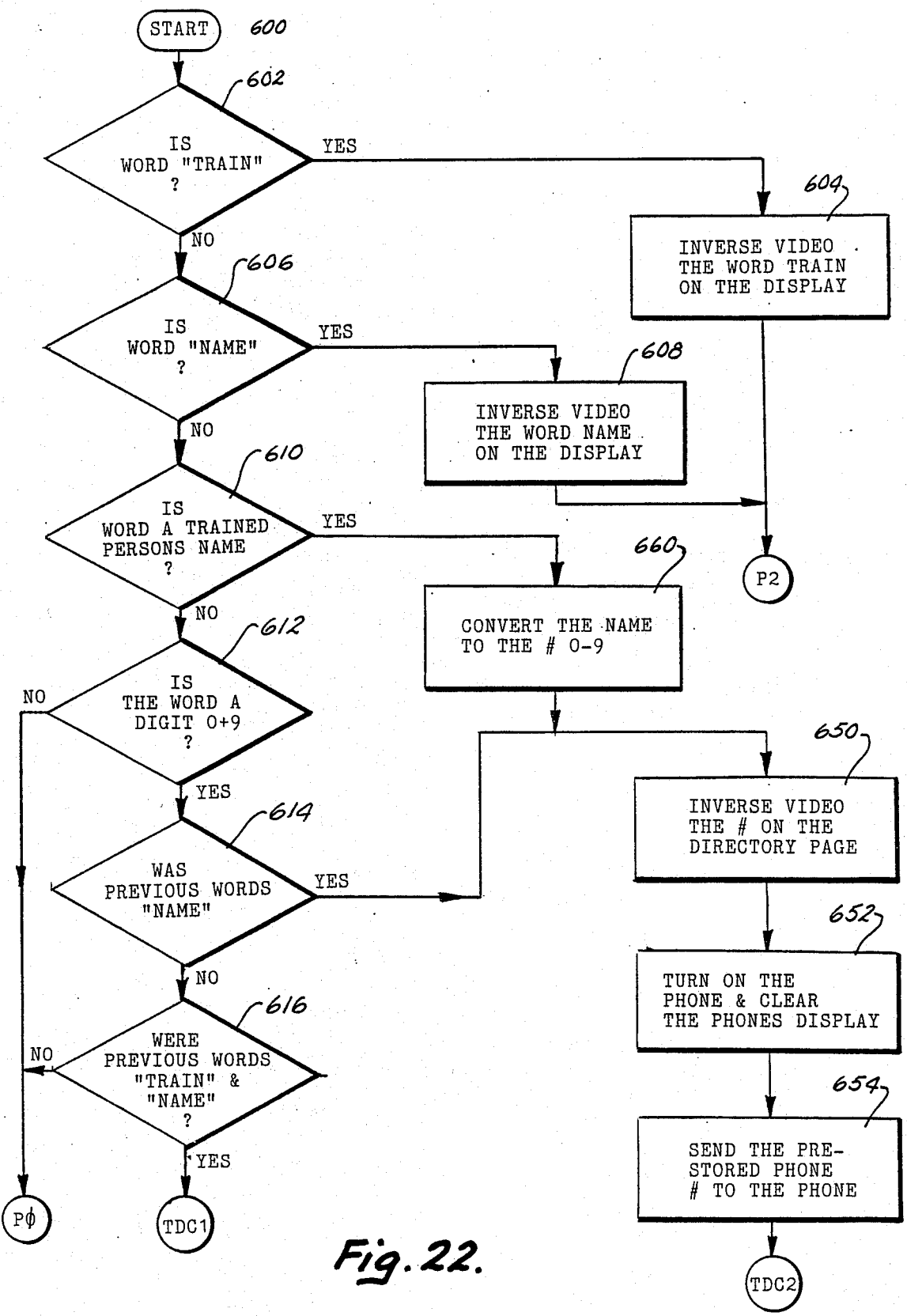
Figure 23:
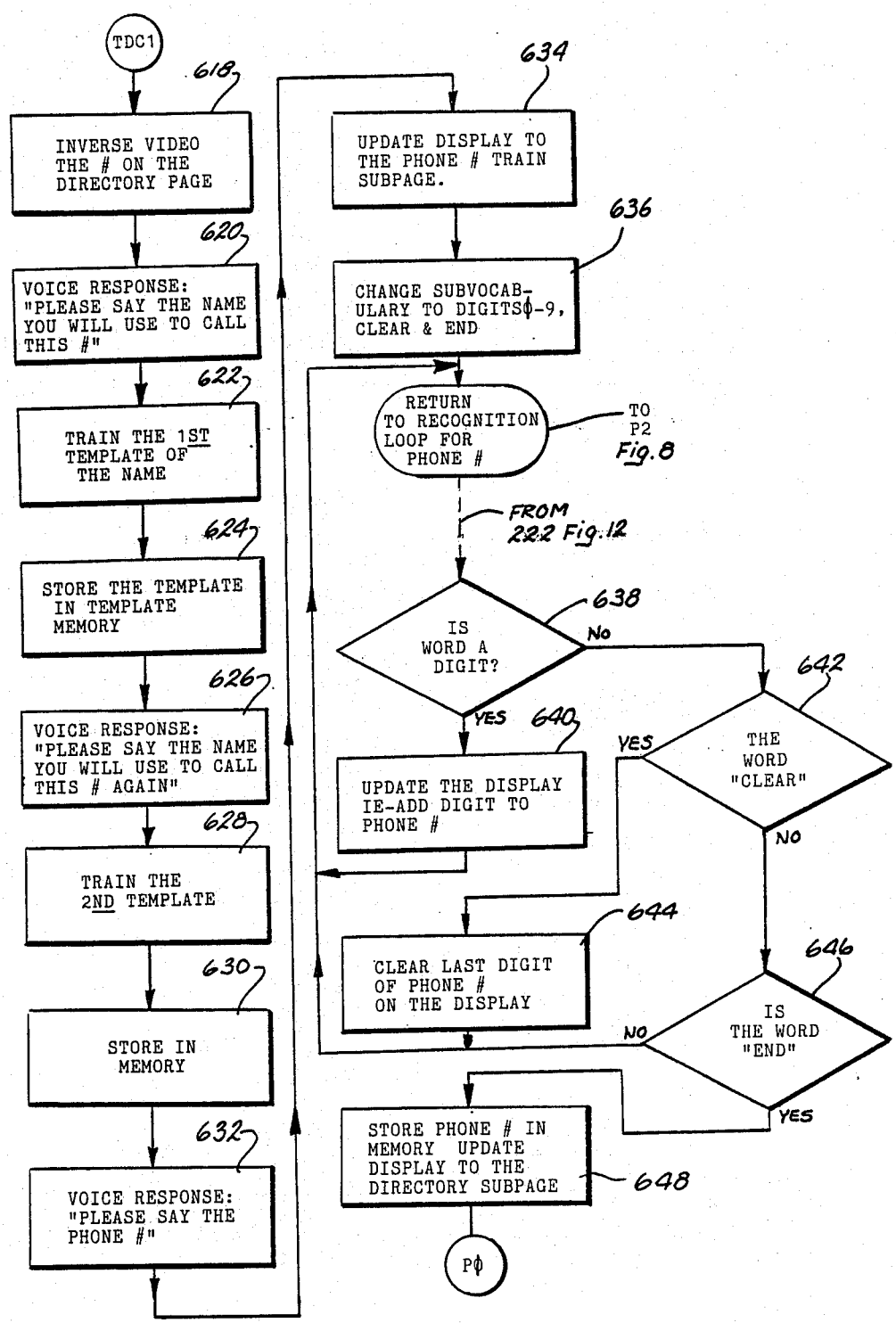

The phone command is one of the primary pages of the system as indicated by the hard wired switch 39 (FIG. 13). The phone program can be accessed as other routines by speaking the word "phone" or depressing the switch to cause the page display shown in FIG. 21 to appear. This display mimics the information on the handset and is located on a vehicle dashboard on the 7"×10" display 34 at a location where the driver can readily see the display. The telephone calling and programming of numbers in the telephone directory begins with the start of the telephone subroutine in block 600 (FIG. 22). The first decision is whether the recognized word is "train". If this word is train, the word train is inverse video displayed as indicated by block 604. The program then moves to port P2 of FIG. 8 to look for the next word in the sequence of commands. If the recognized word is not train in block 602, the program checks to see if the word was "name". If the recognized command was name, the system will inverse video the word "name" on the directory page (FIG. 25), (608) and then continue to look for the next recognized voice command.

The next time through the loop the program goes to block 610 and tests if the word is a trained person's name and if so, the name is converted to one of the ten directory locations 0-9 as indicated by block 660 of the program. Assuming the name given the directory location is not a person's name or company name, the next inquiry is whether or not the name is a telephone number location instead of an individual's name. If it is, next the program detects whether the previous word was "name" and if not, tests whether or not the previous words were "train" and "name" as indicated by block 616. If the answer is "yes", the program goes to the telephone directory calling port TDC1 of FIG. 23. If during the training subroutine the location of the directory slot 0-9 were not identified by block 612 or the spoken commands were not trained and the name given for the slot location either a digit or a person's name, then the training routine would end and the program would return to P0. Assuming, however, the operator has responded with the prompt train name 0, location 0 would be reversed videoed as displayed on the FIG. 25 display format as indicated by block 618 of FIG. 23. Next, the audible prompt will request identification of that slot for future use by the operator with the prompt "Please say the name you will use to call this number" as indicated by block 620. The program then moves to the training of the name template for the slot as indicated by block 622 which, of course, goes into the training routine 148 previously described. Once the name has been trained, it is stored in the template memory 107 as indicated by block 624 and the program trains the second voice template to the same name by asking the operator to repeat the name as indicated by block 626. The second template for the name is trained as indicated by block 628 by the subroutine 148 and stored in memory as indicated by block 630.

Figure 25:
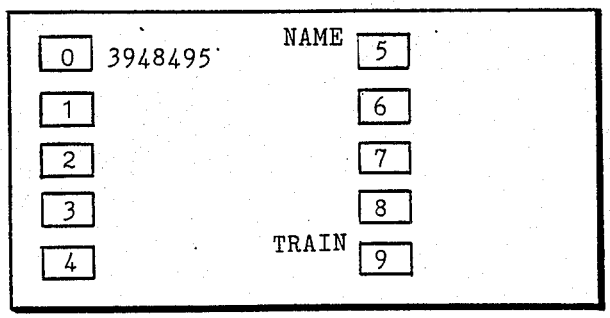
FIG. 25 is a front elevational view of the display associated with the programming of a number in the telephone directory.

Next, the audible prompt requests the user to speak the telephone numbers as indicated by block 632 for that directory location. As each digit of the telephone number is spoken, it appears on the display for example as seen in FIG. 25 location 0 where the number 394-9495 has been entered. During training a subpage is displayed which contains the words "train", "clear", "end" and a space for the numbers of the digit to be displayed as indicated by blocks 634 and 636. The program then goes to port P2 of FIG. 8 for training of the telephone number with the training program including a test as indicated by block 638 as to whether or not the word is a digit and for updating the digit on the display as indicated by block 640. Once the digits of the phone number are spoken and displayed, the user typically will either clear the number and if a mistake is made or state the term "end" indicating the end of the number to be stored in the directory. If the word "clear" is spoken as indicated by the test block 642, the last digit of the phone number is deleted and the training subroutine continues as indicated by block 644. If the word "clear" is not spoken, the program tests to see if the word spoken is "end" and if not, the programming of the number in the named directory slot continues.

Upon completion of the telephone number, the user speaks the word "end" which is detected by block 646 and the number is stored in the memory and the display page is updated to display the directory subpage as shown in FIG. 25 which now includes the telephone number followed by a name of the number that it is associated with the number such as Smith. The program then returns to P0 until such time as the telephone is desired to be used.

For use of the telephone, the program again begins at block 600 indicated in FIG. 22 and tests 602 indicates the word is not "train", but rather the trained person's name such as detected by block 610 which is converted to a directory location indicated by block 660 and the directory page of FIG. 25 is highlighted and the name inversed videoed as indicated by block 650. Upon recognition of a trained name location with a number, the microprocessor 96 provides a signal to the telephone through interface circuit 99 which turns on the phone and clears the phone display after which the prestored phone number is sent to the phone control mechanism for causing the phone to store the telephone number which has been requested as indicated by block 654. The program then goes to port TDC2 of FIG. 24 in which the program automatically enters the command "send" for activating the phone to send the number by its radio link as indicated by block 656. The display is updated to the main phone page (658) again as shown in FIG. 21. After a telephone conversation is completed, the phone call is terminated by the operator giving the sequential command "stop" which in effect hangs up the phone by terminating the cellular phone operation and the program returns to the P0 port.

Other conventional phone operation commands are provided for use of the phone. Thus, for example the operator can simply read the phone number directly into the system which recognizes the digits and sends the number directly without using the directory. The phone's power can be turned off after the termination of a call by stating "power". The phone 40 will include its own remote speaker and a microphone for receiving outgoing information while the received conversation is provided by its speaker to allow hands-off phone calling if desired or the phone's handset can be used.

Thus, there has been described a system which uniquely processes voice command information from an operator to assure the accuracy of the information detected and provide redundant verification of the information before a control command is carried out. The system can interface with a variety of vehicle accessories as described herein and can provide for selected training and retraining at the operator's option such that the system can be initially introduced to the vehicle operator by training only one or two pages initially for limited control functions until the operator has become comfortable with the system operation and desires to train additional functions. Further, the system provides visual display prompts as well as audible prompts to the vehicle operator to assist in both the training and operation of the system and allows for both voice control of the system as well as touch control of the words appearing on the display screen. The programming described in connection with the programming flow diagrams can be varied according to a variety of standard programming techniques as desired to provide the desired functions described. These and other modifications to the preferred embodiment of the invention as described herein can be made without departing from the spirit or scope of the invention as defined by the appended claims.

The embodiment of the invention in which an exclusive property of privilege is claimed are defined as follows:

1. A voice actuated control system for controlling a vehicle accessory comprising:
   means for storing first data defining a plurality of spoken words which are employed to provide selected control functions;
   means for receiving spoken command words and providing second data defining each of the received spoken command words;
   means for comparing said second data with said first data and assigning a digital number representing the closeness of said second data with the closes word representative data of said first data, wherein said comparing and assigning means assigns first and second digital numbers representating the closeness of the second data to first and second word representative data of said first data and representing the first and second closest word matches and wherein said system further includes means coupled to said comparing means for prompting the operator to verify if the spoken command was correctly detected to resolve any ambiguity if the difference between said first and second digital numbers fall within a second predetermined limit thereby indicating a possible ambiguity in the word detected; and
   control means responsive to signals from said comparing means indicting a word match for providing a control output signal associated with a spoken command word when said digital number falls within a predetermined number limit thereby indicating the probability of a correct word match.

2. The system a defined in claim 1 wherein said prompting means includes means for providing an audible inquiry to the operator.

3. The system as defined in claim 2 wherein said audible inquiry comprises an interrogative statement.

4. The system as defined in claim 3 wherein said statement comprises the question, "Did you say" followed by the command word of the closest match.

5. A voice actuated control system for controlling a vehicle accessory comprising:
   means for storing first data defining a plurality of spoken words which are employed to provide selected control function;
   means for receiving spoken command words and providing second data defining each of the received spoken command words;
   means for comparing said second data with said first data and assigning a digital number representing the closeness of said second data with the closest word representative data of said first data, wherein said first data comprises at least two separate stored digital data sequences representing each word and wherein said comparing means compares said second data from said receiving means with each of said stored digital data sequences; and
   control means responsive to signals from said comparing means indicating a word match for providing a control output signal associated with a spoken command word when said digital number falls within a predetermined number limit thereby indicating the probability of a correct word match.

6. A voice actuated control system for controlling a vehicle accessory comprising:
- means for storing first data defining a plurality of spoken words which are employed to provide selected control functions;
- means for receiving spoken command words and providing second data defining each of the received spoken commands words, wherein said means for receiving spoken command words includes a microphone positioned in a vehicle above and forward of the operators mouth;
- means for comparing said second data with said first data and assigning a digital number representing the closeness of said second data with the closest word representative data of said first data; and
- control means responsive to signals form said comparing means indicating a word match for providing a control output signal associated with a spoken command word when said digital number falls within a predetermined number limit thereby indicating the probability of a correct word match.

7. A voice actuated control system for controlling a vehicle accessory comprising:
- means for storing first data defining a plurality of spoken words which are employed to provide selected control functions;
- means for receiving spoken command words and providing second data defining each of the received spoken command words;
- means for comparing said second data with said first data and assigning a digital number representing the closeness of said second data with the closest word representative data of said first data; and
- control means responsive to signals from said comparing means indicating a word match for providing a control output signal associated with a spoken command word when said digital number falls within a predetermined number limit thereby indicating the probability of a correct word match wherein said control means further includes a pushbutton switch for selectively enabling said receiving means to detect spoken words only during a predetermined window of time initiated by each actuation of said switch.

8. The system as defined in claim 7 wherein said control means responds to the actuation of said switch during the time a control function is being carried out to provide an output signal to discontinue said control function.

9. A voice actuated control system for controlling a vehicle accessory comprising:
- means for storing a predetermined number of command words defining a vocabulary for controlling selected functions of a vehicle, wherein said words are arranged according to pages with each page having words contained thereon necessary to complete a predetermined control function;
- means for recalling selected stored command words according to a predetermined pattern of functions selected to be carried out by the operator;
- means for detecting a spoken command and comparing the spoken command with the selected stored command words to determine if there is a word match; and
- control means responsive to the detection of a word match for providing a control output signal associated with a spoken word which matches a stored word.

10. A voice actuated control system for controlling a vehicle accessory comprising:
- means for storing a predetermined number of command words defining a vocabulary for controlling selected functions of a vehicle, wherein said words are arranged according to pages with each page having words contained thereon necessary to complete a predetermined control function, and wherein one of said pages comprises a radio control page;
- means for recalling selected stored command words according to a predetermined pattern of functions selected to be carried out by the operator;
- means for detecting a spoken command and comparing the spoken command with the selected stored command words to determined if there is a word match; and
- control means responsive to the detection of a word match for providing a control output signal associated with a spoken word which matches a stored word.

11. A voice actuated control system for controlling a vehicle accessory comprising:
- means for storing a predetermined number of command words defining a vocabulary for controlling selected functions of a vehicle, wherein said words are arranged according to pages with each page having words contained thereon necessary to complete a predetermined control function, and wherein one of said pages comprises a telephone control page;
- means for recalling selected stored command words according to a predetermined pattern of functions selected to be carried out by the operator;
- means for detecting a spoken command and comparing the spoken command with the selected stored command words to determine if there is a word match; and
- control means responsive to the detection of a word match for providing a control output signal associated with a spoken word which matches a stored word.

12. A voice actuated control system for controlling a vehicle accessory comprising:
- means for storing a predetermined number of command words defining a vocabulary for controlling selected functions of a vehicle, wherein said words are arranged according to pages with each page having words contained thereon necessary to complete a predetermined control function, and wherein one of said pages comprises a vehicle window control page;
- means for recalling selected stored command words according to a predetermined pattern of functions selected to be carried out by the operator;
- means for detecting a spoken command and comparing the spoken command with the selected stored command words to determine if there is a word match; and
- control means responsive to the detection of a word match for providing a control output signal associated with a spoken word which matches a stored word.

13. A voice actuated control system for controlling a vehicle accessory comprising:

means for storing a predetermined number of command words defining a vocabulary for controlling selected functions of a vehicle, wherein said words are arranged according to pages with each page having words contained thereon necessary to complete a predetermined control function, and wherein one of said pages comprises a summary page of available control functions for the system;

means for recalling selected stored command words according to a predetermined pattern of functions selected to be carried out by the operator;

means for detecting a spoken command and comparing the spoken command with the selected stored command words to determine if there is a word match; and control means responsive to the detection of a word match for providing a control output signal associated with a spoken word which matches a stored word.

14. A voice actuated control system for controlling a vehicle accessory comprising:

means for storing data representing a plurality of command words which are employed to provide selected control functions;

display means for displaying said command words which will effect control functions indicated by said display means;

means for receiving spoken command words and converting such audio information into data which corresponds to the stored to the stored command word data when the stored command words are spoken;

means for comparing data representing spoken command words with data representing said stored command words which are displayed to determine if a word match has occurred;

control circuit means coupled to said comparing means and responsive to a word match for providing a control output signal associated with a spoken word which matches a stored stemplate;

switch means having a plurality of switch locations identified by and aligned with said command words of said display means for providing said control output signal for the command word when the switch associated with the display command word is actuated by the operator; and a vehicle accessory having a control input coupled to said control circuit and responsive to control output signals for controlling the operation of the vehicle accessory according to the spoken commands.

15. The system as defined in claim 14 wherein said accessory is a telephone.

16. A voice control for use in a vehicle comprising:

storage circuit means for storing data corresponding to voice commands to be recognized by the system;

means for detecting spoken voice commands and providing data corresponding to such commands;

means for comparing spoken voice command data with voice command data in said storage means for determining if a match has occurred and for providing a control output signal in such event;

means for selectively providing audible prompts to the operator for operation of the system; and display means for displaying voice command words which will be recognized.

17. The system as defined in claim 16 wherein said display means comprises an electroluminescent display.

18. A voice controlled system for controlling the operation of accessories in a vehicle comprising:

a microprocessor and memory means for said microprocessor;

a voice processor circuit coupled to said microprocessor;

sound transducing means and means coupling said sound transducing means to said voice processing circuit for supplying audio information to and from the operator to said voice processing circuit; and program means for said microprocessor and contained in said memory means for operating said microprocessor for comparing signals identifying words spoken by an operator with stored signals representing the words for testing first and second closed word matches to verify if a spoken word is a recognizable command, wherein each first and second closest word match is assigned a digital number indicating the closeness of the word to a stored word.

19. The system as defined in claim 18 wherein at least one of said digital numbers is compared to a reference number to determine if a valid word command has been detected.

20. The system as defined in claim 19 wherein said digital numbers are compared to each other to determine the closeness of the words.

21. A method of testing data for a voice actuated control system for a vehicle to assure an accurate word match has occurred comprising the steps of:

providing first digital data representing storing at least one voice print of each word in the vocabulary of command words to be used;

providing second digital data representing a word command spoken by the operator;

comparing the second digital data with said first digital data to determine the first and second closest comparisons representing first and second closest word matches;

assigning a digital number to said first and second word matches representing the closeness of the second digital data to a word representing by said first data;

correlating said digital numbers against each other and predetermined constants;

providing a control output signal for actuating a vehicle accessory in the event predetermined correlation occurs indicating a spoken command word has reliably been detected, wherein said first digital data includes a redundant stored command word for each command word of the vocabulary; and wherein said correlation step includes testing the first and second word matches to determine if they are the same.

22. A method of testing data for a voice actuated control system for a vehicle to assure an accurate word match has occurred comprising the steps of:

providing first digital data representing storing at least one voice print of each word in the vocabulary of command words to be used;

providing second digital data representing a word command spoken by the operator;

comparing the second digital data with said first digital data to determine the first and second closest comparisons representing first and second closest word matches;

assigning a digital number to said first and second word matches representing the closeness of the second digital data to a word represented by said first data;

correlating said digital numbers against each other and predetermined constants, wherein said correlation step includes testing the number corresponding to the first closest match to determine if it is less than a constant and therefore, a good match; and providing a control output signal for actuating a vehicle accessory in the event predetermined correlation occurs indicating a spoken command word has reliably been detected.

* * * * *

UNITED STATES PATENT AND TRADEMARK OFFICE
CERTIFICATE OF CORRECTION

PATENT NO. : 4,827,520

DATED : May 2, 1989

INVENTOR(S) : Mark Zeinstra

It is certified that error appears in the above-identified patent and that said Letters Patent is hereby corrected as shown below:

Abstract, Line 17
   After "word" insert --data--
Column 3, Line 51
   "preferrably" should be --preferably--
Column 3, Line 64
   "circuit 6" should be --circuit 60--
Column 4, Line 29
   "ca" should be --can--
Column 5, Line 56
   "circuit 1" should be --circuit 91--
Column 6, Line 55
   "ciruit" should be --circuit--
Column 6, Line 28
   "Commercially" should be --commercially--
Column 7, Line 34
   After "of" insert --a--
Column 9, Lines 41 and 42
   "panel 3" should be --pánel 30--
Column 10, Line 43
"P" should be --PO--
Column 14, Line 24
   "existance" should be --existence--
Column 18, Claim 1, Line 18
   "closes" should be --closest--
Column 18, Line 40, Claim 2
   "a" should be --as--
Column 21, Claim 14, Line 40
   "stemplate" should be --template--
Column 22, Claim 18, Line 5
   "processor" should be --processing--

UNITED STATES PATENT AND TRADEMARK OFFICE
CERTIFICATE OF CORRECTION

PATENT NO. : 4,827,520

DATED : May 2, 1989

INVENTOR(S) : Mark Zeinstra

It is certified that error appears in the above-identified patent and that said Letters Patent is hereby corrected as shown below:

Column 22, Claim 18, line 16, "closed" should be --closest--.

Signed and Sealed this

Twenty-ninth Day of January, 1991

Attest:

HARRY F. MANBECK, JR.

*Attesting Officer*    *Commissioner of Patents and Trademarks*